(12) United States Patent
Schmuland et al.

(10) Patent No.: US 12,390,860 B2
(45) Date of Patent: Aug. 19, 2025

(54) LASING MODULE FOR 3D PRINTING SYSTEM

(71) Applicant: Freeform Future Corp., El Segundo, CA (US)

(72) Inventors: Derek Schmuland, El Segundo, CA (US); Thomas J. Ronacher, Manhattan Beach, CA (US); Daniel Roszhart Zehr, Erie, CO (US)

(73) Assignee: Freeform Future Corp., Hawthorne, CA (US)

( * ) Notice: Subject to any disclaimer, the term of this patent is extended or adjusted under 35 U.S.C. 154(b) by 15 days.

(21) Appl. No.: 17/944,883

(22) Filed: Sep. 14, 2022

(65) Prior Publication Data

US 2023/0085428 A1    Mar. 16, 2023

Related U.S. Application Data

(60) Provisional application No. 63/244,355, filed on Sep. 15, 2021.

(51) Int. Cl.
| | |
|---|---|
| *B22F 12/41* | (2021.01) |
| *B22F 10/28* | (2021.01) |
| *B22F 12/90* | (2021.01) |
| *B23K 26/34* | (2014.01) |

(Continued)

(52) U.S. Cl.
CPC ............. *B22F 12/41* (2021.01); *B22F 10/28* (2021.01); *B22F 12/90* (2021.01); *B23K 26/34* (2013.01); *B33Y 30/00* (2014.12); *G02B 26/0816* (2013.01)

(58) Field of Classification Search
CPC .......... B22F 12/41; B22F 12/90; B22F 10/28; B23K 26/34; G02B 26/0816
See application file for complete search history.

(56) References Cited

U.S. PATENT DOCUMENTS

| | | |
|---|---|---|
| 2014/0065194 A1 | 3/2014 | Yoo et al. |
| 2015/0352664 A1 | 12/2015 | Errico et al. |
| 2018/0178449 A1 | 6/2018 | Cheverton et al. |

(Continued)

OTHER PUBLICATIONS

Reflection of light article, https://www.sciencelearn.org.nz/resources/48-reflection-of-light (Year: 2012).*

(Continued)

*Primary Examiner* — Alison L Hindenlang
*Assistant Examiner* — Erica Hartsell Funk
(74) *Attorney, Agent, or Firm* — Lee & Hayes, P.C.

(57) ABSTRACT

A 3D printing system uses lasers for manufacturing parts in metal additive manufacturing, such as powder-bed fusion. The lasers may be arranged on a dome-shaped structure, vertically above powdered metal. The dome-shaped structure, and arrangement of the lasers on the dome-shaped structure, permits a higher density of the lasers to be packaged onto the 3D printing system and increases a utilization of the lasers during manufacturing. Mirror(s) allow the lasers to be selectively, and individually, steered towards particular locations within the powdered metal in which the parts are manufactured. Lens(es) may actuate to adjust a spot size of laser beams emitted by the lasers. Imaging sensor(s) may also monitor the powdered metal, such as a melt pool of the powdered metal, for feedback and use in driving and steering the lasers.

20 Claims, 11 Drawing Sheets

(51) Int. Cl.
　　　*B33Y 30/00*　　　　(2015.01)
　　　*G02B 26/08*　　　　(2006.01)

(56) References Cited

U.S. PATENT DOCUMENTS

| | | |
|---|---|---|
| 2019/0381723 A1 | 12/2019 | Maier |
| 2020/0147867 A1 | 5/2020 | Gold |
| 2020/0316854 A1 | 10/2020 | Daniels et al. |
| 2020/0376553 A1 | 12/2020 | Demuth et al. |
| 2023/0079964 A1 | 3/2023 | Schmuland |

OTHER PUBLICATIONS

Office Action for U.S. Appl. No. 17/944,901, mailed on Oct. 5, 2023, Schmuland, "3D Printing System With Moving Build Module", 7 pages.

The PCT Search Report and Written Opinion mailed Dec. 15, 2022 for PCT application No. PCT/US22/43613, 16 pages.

The PCT Search Report and Written Opinion mailed Dec. 22, 2022 for PCT application No. PCT/US22/43620, 16 pages.

Office Action for U.S. Appl. No. 17/944,901, mailed on Apr. 15, 2024, Schmuland, "3D Printing System With Moving Build Module", 8 pages.

\* cited by examiner

LASING MODULE FOR 3D PRINTING SYSTEM

CROSS REFERENCE TO RELATED APPLICATIONS

This application claims priority to U.S. Provisional Application No. 63/244,355, filed Sep. 15, 2021, entitled "Lasing Module for 3D Printing System," the entirety of which is herein incorporated by reference.

BACKGROUND

Additive manufacturing or 3D printing offers multiple benefits over traditional manufacturing processes. For example, additive manufacturing allows for more complex parts to be manufactured, eliminating many of the design constraints of previous manufacturing processes. Additionally, additive manufacturing reduces material cost and waste. However, print times are relatively long and throughput for existing additive manufacturing systems are low compared to conventional manufacturing processes. Also, additive manufacturing techniques have not been as robust, stable, and/or repeatable as conventional manufacturing processes. Accordingly, there is a need for improvements to additive manufacturing processes and techniques.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
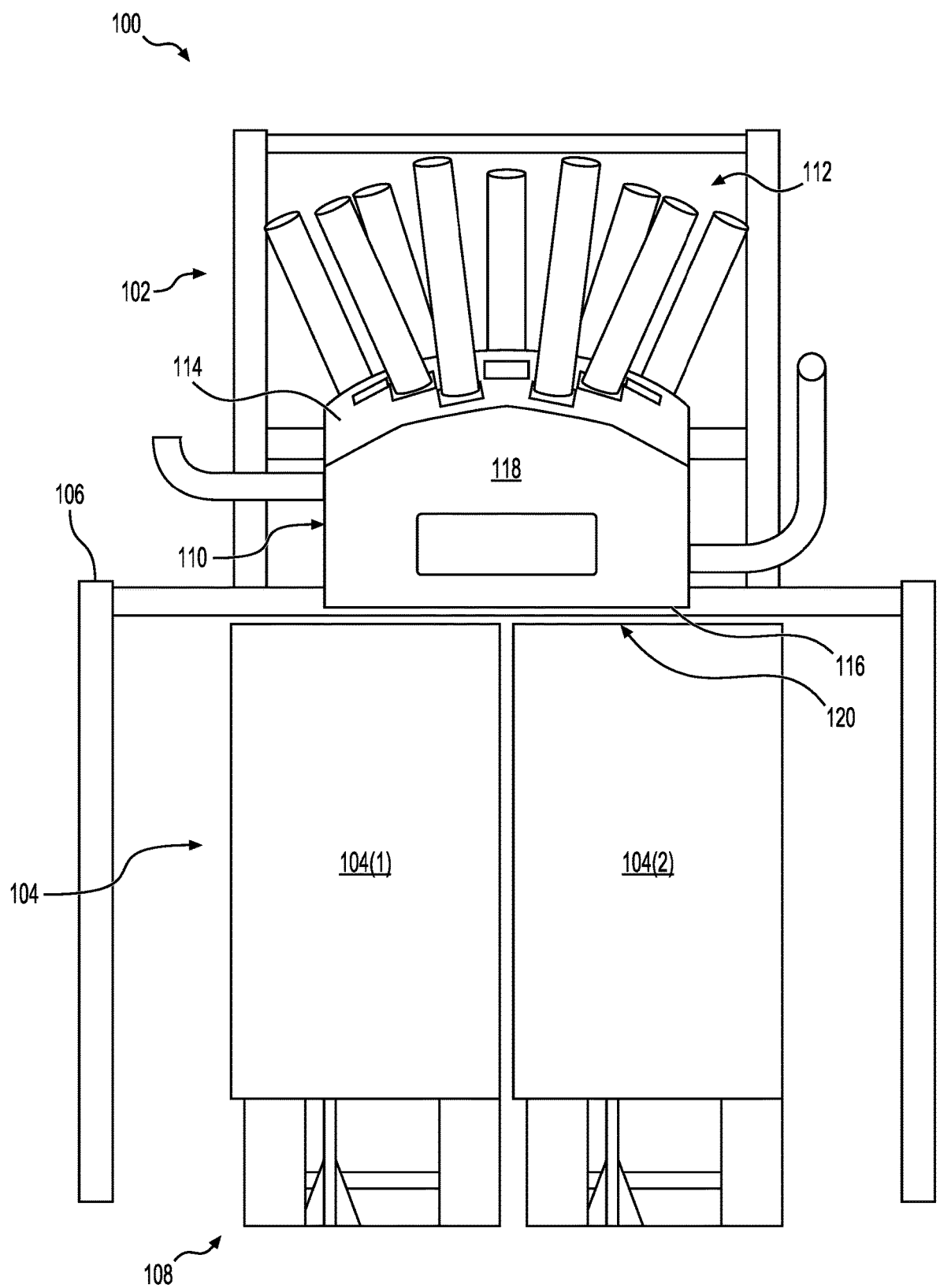
FIG. 1 illustrates an example additive manufacturing system or 3D printing system, according to an example of the present disclosure. As used herein, the terms "additive manufacturing" and "3D printing" are used interchangeably. In some instances, the 3D printing system may include a lasing module disposed above one or more build modules. The lasing module may include a plurality of optical modules having components for melting powdered metal within or on the build modules, as well as for imaging the melted powdered metal (e.g., melt pool) within the build modules. The optical modules include various lens(es) and/or mirror(s) for steering laser beams towards the powdered metal, as well as imaging sensor(s) for imaging (e.g., melt pool) during the printing process.

This patent application describes a 3D printing system that uses heat sources for manufacturing parts in metal additive manufacturing, such as powder-bed fusion. In powder-bed fusion, powdered metal is selectively melted using lasers (e.g., laser beam, electron beam, thermal print head, etc.). The 3D printing system described herein may utilize multiple heat sources, such as lasers, for producing parts with improved precession, accuracy, and repeatability. For example, the lasers may be arranged on a dome-shaped structure, vertically above the powdered metal. This shape, and arrangement of the lasers on the dome-shaped structure, permits a higher density of the lasers to be packaged into a given footprint and increases a utilization of the lasers during manufacturing. Moreover, mirrors allow the lasers to be selectively, and individually, steered towards particular locations within a build area in which the parts are manufactured. Lens(es) may actuate to adjust a spot size of laser beams emitted by the lasers on the build area. Imaging sensor(s) (e.g., high speed cameras) may also monitor the build area, such as a melt pool of the powdered metal, during operation to provide feedback for use in driving and steering the lasers. As such, the systems and methods herein allow for improved throughput, precision, and efficiencies in additive manufacturing.

The 3D printing system may, in some instances, include a lasing module and a build module. The lasing module may include lasers that generate the laser beams for melting powdered metal disposed in the build module. The lasing module may also provide a processing chamber in which the powdered metal (e.g., aluminum, steel, etc.) is melted. The lasing module may couple to a frame such that the lasing module is disposed vertically above (e.g., overhead) the build module. In some instances, the build module includes a container for receiving the powdered metal and within or on which the parts are manufactured. As explained herein, the lasers are steered toward respective positions on one or more build areas of one or more build modules for melting the powdered metal. In doing so, the laser(s) create melt pools of powdered metal and as the melt pools solidify, structures of the part are formed.

Generally, a build module may be associated with a build area on which parts are manufactured. Parts may be built within a space defined by the build area. In some instances, the build area may be approximately 750 millimeters (mm)×

750 mm. However, the size of the build area may be larger or smaller than this depending on the size, shape, and other characteristics of parts to be made using the 3D printing system. In some instances, the build area may span across multiple build modules, where different parts are manufactured within or across multiple containers. The lasing module and the build module may be separate components to allow multiple different build modules to be used interchangeably with one or more lasing modules. For example, a conveyor system may permit the build modules to traverse underneath the lasing modules. After parts are manufactured in a particular build module, or during a cooling of material within the build module, another build module may be interchanged with the previous build module beneath a respective lasing module. Additionally or alternatively, in some examples a single lasing module may steer lasers to generate melt pools on multiple build modules simultaneously. This allows each lasing module to consistently manufacture parts across a plurality of build modules simultaneously and/or sequentially and with minimal downtime.

In some instances, the lasers reside within or are a component of an optical module. The lasing module includes a structure for receiving a plurality of the optical modules. The structure serves to at least partially orient the optical modules, and therefore the lasers, towards the build module and the build area. For example, in some instances, the lasing module includes the dome-shaped surface (e.g., geodesic dome, hemisphere, etc.) to which the optical modules couple. Coupling the optical modules to the dome-shaped structure disposes the optical modules at various orientations relative to the build module. In some instances, the lasing module may include any number of optical modules, such as two, four, ten, twenty, forty, one hundred, and so forth, and each optical module may include a single laser or multiple lasers (e.g., two, three, four, five, etc.). In some instances, the lasing module may include sixteen optical modules coupled to the dome-shaped surface. The optical modules are mounted exterior to the processing chamber in which the powdered metal is melted. Such positioning assists in cooling the optical modules and prevents a buildup of debris or off gases on the optical modules during melting of the powdered metal.

In some instances, each of the optical modules may include more than one laser. For example, each optical module may include two lasers. As such, in the example above including sixteen optical modules, the lasing module may include thirty-two lasers for manufacturing parts. However, it is to be understood that the lasing module may include more than or less than sixteen optical modules and/or each of the optical modules may include more than or less than two lasers. The number of optical modules and lasers may vary based on the size of the build area, the size of the lasing module, the power of the individual lasers, and other factors.

In addition to housing the lasers, the optical modules include mirror(s) and/or lens(es) for directing or "steering" laser beams generated by the lasers towards the build area as well as altering characteristic(s) of the laser beam (e.g., spot size, focal length, etc.). In some instances, each of the lasers produces a respective laser beam that is oriented towards the build area using a combination of lens(es) and mirror(s). The mirror(s) and/or lens(es) provide respective beam paths for the laser beams, from the lasers to the powdered metal. As discussed in detail herein, a plurality of mirror(s) and/or lens(es) may be used to steer, or otherwise direct, the laser beams towards a particular location or locations within the build area (which may span across one or multiple build modules). For example, the optical modules may include one or more laser mirror(s), one or more dichroic mirror(s), one or more expander lens(es), one or more objective lens(es), one or more single axis steering mirrors (e.g., a mirror galvanometer, commonly referred to as a galvo mirror), and/or one or more turning mirrors. Any combination of lens(es) and/or mirror(s) may be used to steer, or otherwise direct, the laser beams towards a particular location within the build area. For example, a first galvo mirror and a second galvo mirror may include a single axis steering, but may be used to collectively steer the laser beams throughout the build area. Moreover, respective lens(es) in the respective beam paths may be adjusted along the beam path (e.g., using a voice-coil, geared, or belt-driven linear actuator) or have their shape adjusted to change the focus (e.g. using piezo-driven deformable mirrors/lenses or deformable refractive surfaces).

The lasing module, or more generally the 3D printing system, may therefore include any number of laser(s) for manufacturing parts. In some instances, the optical module may include any number of laser(s). Additionally, more than one laser may be directed towards a particular location within the build area. In other words, the mirror(s) of respective optical modules may steer multiple respective laser beams to a particular location within the build area. However, it is to be understood that the laser beams may be steered to different positions within the build area as well. In some instances, individual lasers may be capable of being steered to all positions within the build area. As such, the laser beams generated by the lasers may be steered to any position on the build area. In some instances, the orientation of the optical modules atop the housing may permit the laser beams to be steered to all locations within the build area.

The optical modules may include an imaging sensor (e.g., a complementary metal oxide semiconductor (CMOS) camera, a high-speed camera, digital camera, etc.) that detects a location of a melt pool associated with the laser beams. For example, the imaging sensor may receive imaging beam(s) corresponding to a location of the melt pool within the build area. Such information may be used for determining a location, size, and/or current condition of the melt pool within the build area. The detected location, size, and/or condition may be used to improve the accuracy or precision in which the laser beam(s) are steered. For example, depending upon the imaging of the melt pool, the lens(es) and/or mirror(s) may be adjusted to adjust a focal length of the laser beam and/or steer the laser beam to different locations within the build area.

For ease of reference, light from the melt pool that travels from the melt pool to the imaging sensors is referred to herein as an "imaging beam" or "imaging beams." In some instances, the imaging beam(s) may travel along at least a portion of a path of the laser beam to the imaging sensor(s). For example, to reach the imaging sensor(s), the imaging beam(s) may at least partially traverse a path of the laser beam through the optical module. The imaging beams and the laser beams may therefore be reflected and transmitted through similar components. Such design may reduce a form factor of the optical module and/or the lasing module.

In some instances, the imaging sensor(s) may be configured to image light of different wavelengths. In some examples, the lasing module may include imaging sensor(s) configured to image light having wavelengths between 700 microns and 1000 microns, though in other examples, the lasing module may include imaging sensor(s) configured to image light having wavelengths above, below, within, and/or partially spanning this range. The capability of imaging sensor(s) to image the various wavelengths of light permits the imaging sensor to dynamically adjust for imaging the melt pool. For example, adjusting the spot size of the laser beam, via the lens(es), may change a size of the image received by the imaging sensor(s). That is, since the laser beam and the imaging beam(s) at least partially share a similar path within the optical module, adjusting the lens(es) correspondingly adjusts the image size and resolution of the imaging beam(s). For example, at a distant point on the build area, a path length of the laser beam may be longer as compared to a proximal point on the build area. To create a consistent spot size of the laser beam on the build area, however, the lens(es) may be adjusted to alter a focal length of the laser beam (e.g., longitudinally translating along a length of the path). Altering the focal length, however, changes wavelengths of light that are transmitted to the imaging sensor(s) or which are in focus for the imaging sensor. As such, by varying the wavelengths of light that are capable of being received by the imaging sensor(s), the melt pool may be accurately imaged with the varying characteristics of the laser beams and their projected location on the build area.

In some instances, a doublet focus lens and/or a liquid dynamic lens may be used to focus the wavelengths of light for imaging by the imaging sensor(s). For example, the doublet focus lens may focus imaging beam(s) associated with the melt pool and/or correct aberrations introduced by the one or more expander lens(es) and/or the one or more objective lens(es). The liquid dynamic lens may also account for the varying wavelengths of light transmitted to the imaging sensor(s) to focus the particular wavelengths of light received. Additionally, or alternatively, in some instances, static focusing optics or other optical elements may adjust the desired image size on the imaging sensor(s).

One or more controllers may control the various lens(es), mirror(s), laser(s), imaging sensor(s), and/or other components of the 3D printing system. In some instances, each of the optical modules may include a respective controller for controlling components thereof. For example, the controller may cause the mirror(s) to steer the laser beams towards particular locations on the build area, may cause the lens(es) to adjust for altering the focal length of the laser beam (e.g., based on the imaging beam(s)), and/or may control intensity of the laser beams, and so forth. However, a central controller or other computing device may control the plurality of controllers disposed across the optical modules of the lasing module.

The 3D printing system may also include heat dissipating element(s) for dispersing heat generated by various components during use. For example, heat generated by the lasers may be dissipated via one or more thermal management components. The thermal management components may include one or more heat sinks, fans, cooling blocks, heat pipes (e.g., conduits), or the like. In some examples, a frame to which the lasers (and other components of the optical module) couple may include, or have coupled thereto, one or more channels, pipes, cavities, or other structures for receiving liquid (e.g., coolant). The liquid may be circulated throughout and/or in contact with the frame for cooling the frame and components coupled thereto (e.g., lasers) and maintaining thermal stability. Additionally, or alternatively, the housing or the dome-shaped surface of the housing to which the optical modules couple may include channels, pipes, cavities, or other structures for receiving liquid (e.g., coolant). The positioning of the optical modules on the dome-shaped structure, external to the processing chamber, further improves heat transfer away from the optical modules. For example, air may flow between and around adjacent optical modules for dissipating heat. In some examples, one or more fans may be used to promote airflow across the optical modules to further promote convective heat transfer to the environment.

The 3D printing system described herein enables sustainable manufacturing of parts with improved manufacturing speed, accuracy, precision, stability, and repeatability. Additionally, due to the relatively large number of lasers, the 3D printing system also provides improved redundancy and fault tolerance that improves the reliability of the 3D printing system relative to existing 3D printing systems. In some instances, the optical modules that include the lasers are arranged on a geodesic dome to enable a high packing density of lasers to work collaboratively and collectively. The optical modules are mounted overhead of the build area in/on which parts are manufactured. In some instances, the lasers within the optical modules include a field of view that is substantially the same as the build area. As such, each of the lasers may emit laser beams that are capable of being steered towards any location throughout the build area. In some instances, each of the optical modules may include two lasers that are independently controlled via respective controllers. The optical module further includes a liquid dynamic lens that adjusts to maintain clarity for chromaticity and focus depending on the wavelength of color received. Such flexibility allows for the imaging sensor(s) to image the melt pool for use in making adjustments to the laser.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 illustrates an example 3D printing system 100 used to manufacture parts. In some instances, the 3D printing system 100 includes a lasing module 102 and one or more build modules 104. The lasing module 102 is shown residing vertically above (e.g., overhead) the build modules 104. As shown in FIG. 1, the build modules 104 may include at least a first build module 104(1) and a second build module 104(2). In some instances, the lasing module 102 (or a structure thereof) couples to a gantry 106 that disposes the lasing module 102 above the build module 104.

The first build module 104(1), the second build module 104(2), as well as other the build modules 104, are configured to pass underneath the lasing module 102 (and/or the gantry 106) such that the lasing module 102 may build parts within a bed of powdered material disposed in containers of the build modules 104, respectively. For example, the build modules 104 may be conveyed via a conveyor system 108 (e.g., tracks, rollers, belts, etc.) into the lasing module 102. In other words, the conveyor system 108 may move the build modules 104 into and out of the lasing module 102 such that parts may be built across the build modules 104, or across a plurality of build modules 104. In some instances, the conveyor system 108 may be stationary while the lasing module 102 is manufacturing parts, or the conveyor system 108 may be moving while the lasing module 102 is manufacturing parts. However, in some instances, rather than including the conveyor system 108 to maneuver the build modules 104, additionally or alternatively, the build modules 104 themselves may include components for orienting and transporting the build modules 104 about an environment. For example, the build modules 104 may include motor(s) or other drivers (e.g., tracks, wheels, etc.) that maneuver the build modules 104 about the environment, such as through the lasing module 102 as parts are being manufactured, across lasing modules within the environment, while parts are cooling, and so forth. In some instances, the build modules 104 may maneuver about the environment on a system of tracks, or may freely maneuver about a floor. In some instances, the build modules 104 may include sensors for imaging fiducials within the environment in order to properly maneuver the build modules 104 about the environment. Additionally, the build modules 104 may include actuators that are capable of tilting, or otherwise orienting the build modules 104 relative to the lasing module.

The lasing module 102 includes a housing 110 (e.g., hood) that receives a plurality of optical modules 112. The housing 110 may include a top 114, a bottom 116, and sides 118. The top 114 (e.g., ceiling) is shown being disposed vertically away from the build modules 104, whereas the bottom 116 is shown being disposed adjacent to the build modules 104. The sides 118 are shown disposed between the top 114 and the bottom 116. In some instances, the sides 118 may include one or more windows that permit viewing of a build area in which parts are manufactured. As discussed herein, the top 114, the bottom 116, and the sides 118 may collectively define a cavity, such as a processing chamber 120, within which the parts are manufactured. As such, the bottom 116 may be opened-end such that laser beams generated by the optical modules 112 may be transmitted to the build modules 104 (and the powdered metal) for building parts. Although a particular alignment of the build modules 104 on the lasing module 102 is shown, other alignments are envisioned. For example, more of the first build module 104(1) may be disposed beneath the lasing module 102, as compared to the second build module 104(2). Additionally, the build modules 102 may enter the lasing module 102 differently than shown (e.g., from the side).

The optical modules 112 are shown being located external to the processing chamber 120. Such positioning permits improved cooling of the optical modules 112 (and components thereof) and prevents a buildup of off gases and soot generated during a melting of the powdered metal. That is, during melting of the powdered metal, off gases and/or soot may accumulate within the processing chamber 120, and the processing chamber 120 may act as a hood to prevent dispersion of the off gases and/or debris. In some instances, vacuums or a flow of air/gasses may be provided into the processing chamber 120 to remove the off gases and/or debris.

The top 114 is shown including a dome shaped section onto which the optical modules 112 are disposed. The top 114 may include a smooth dome-shaped surface, or may represent a geodesic dome formed via a plurality of sections coupled together (e.g., via triangle, pentagons, hexagons, etc.). The optical modules 112 may be respectively coupled to sections of the geodesic dome. In some instances, each optical modules 112 may have an elongated axis and may be mounted with the elongated axis being orthogonal to a surface of the dome or section of the dome to which the respective optical module 112 is attached. In some instances, the surfaces of the geodesic dome to which the optical modules 112 couple may be substantially planar.

The profile of the top 114 orients the optical modules 112 at a plurality of angles relative to the build modules 104 (and therefore the build area). For example, as shown, the optical modules 112 may be situated as an array, across and about the top 114, so as to be oriented towards the build area. In some instances, any number of optical modules 112 may couple to the top 114, or stated alternatively, the lasing module 102 may include any number of the optical modules 112. For example, in some instances, ten, fifty, or hundred(s) of the optical modules 112 may couple to the top 114. The shape of the top 114 and the shape and configuration of the optical modules 112 permits a greater number of optical modules 112 (and therefore lasers) to be included within the lasing module 102 than if the top were flat, for example. That is, the dome-shaped surface of the top 114 allows for a greater number of the optical modules 112 to be packaged within a footprint of the build area. The dome-shaped surface of the top 114 may also permit individual laser beams to be steered to specific positions within the build area. The optical modules 112 are shown simplified. However, as shown and discussed herein, the optical modules include components for routing the laser beams to the build area. In some instances, a housing is disposed over the components of the optical module 112 (e.g., the lasers, lens(es), mirror(s), etc.). Additionally, although a particular shape and/or detail of the optical module 112 are shown, the optical modules 112 may take other shapes, and/or the shapes between the optical modules 112 may be different from one another.

The top 114 may also include one or more thermal management components (e.g., cooling channels, cooling plates, heat sinks, etc.). In one example, the top 114 may include cooling channels (e.g., passages in the top 114 and/or copper tubing) that routes fluid within and/or adjacent to the top 114 to assist in cooling the top 114 and/or providing thermal stability and uniformity. In some instances, the thermal management components may reside within the top 114 (internally integrated/machined) and/or may reside on a surface of the top 114 (e.g., externally mounted). Pumps, chillers, and so forth may be used to condition fluid routed throughout the top 114.

Additionally, as discussed herein, the optical modules 112 themselves may include any number of laser(s) that generate respective laser beams directed towards the build area. For example, the optical modules 112 may include two lasers, where each of the laser beams generated by lasers may be independently or collectively (e.g., clustered) steered (e.g., via mirror(s)). As such, the lasers may be used individually and collectively when manufacturing parts. Additionally, lens(es) may control a spot size of the laser beams on the build area. An optical pathway of the laser beams may be modified to respectively steer the laser beam toward selective portions of the surface of the powder bed to melt powdered metal, thus creating melt pools at the selected portions of the powder bed surface. Once cooled or solidified, the melt pool(s) create a part (or a structure of the part).

The housing 110 may be manufactured from materials with a low coefficient of thermal expansion. During operation, the optical modules 112, and more specifically the laser(s), may generate large amounts of heat. The housing 110 may be substantially resistant to this heat to avoid imparting shifts or otherwise skewing a position of the optical modules 112. Additionally, as noted above, in some examples, the housing 110 may include one or more thermal management components (e.g., cooling channels, cooling plates, heat sinks, etc.). In some instances, the optical modules 112 (or the top 114) may be spaced apart from the build modules 104 to avoid off gases generated during a manufacturer of the parts obscuring (e.g., fogging, clouding, etc.) the mirror(s) and/or lens(es). In some instances, the top 114 of the housing 110 may be spaced apart from the build area by a distance that permits the optical modules 112 to manufacturer parts within a build area having dimensions of, for example, 750 mm×750 mm. However, the optical modules 112 may be located close enough without sacrificing a build area of the lasing module and a precise spot size (e.g., between 80 microns and 100 microns).

Introduced above, the build modules 104 include containers (e.g., drums, bins, etc.) within which parts are manufactured. In some instances, each of the containers includes a build area within which parts are manufactured. The laser(s) within the optical modules 112 may be capable of reaching build areas (or a portion of the build areas) within each of the first build module 104(1) and the second build module 104(2). Although not shown in FIG. 1, the build modules 104 (or other ports of the 3D printing system) may include a reservoir that stores the powdered metal. In some instances, a rake or other mechanism may supply the powdered metal into the build area. For example, as parts are being manufactured, powdered metal may be disposed in a powder bed in layers, one layer at a time, within the build area.

Figure 2A:
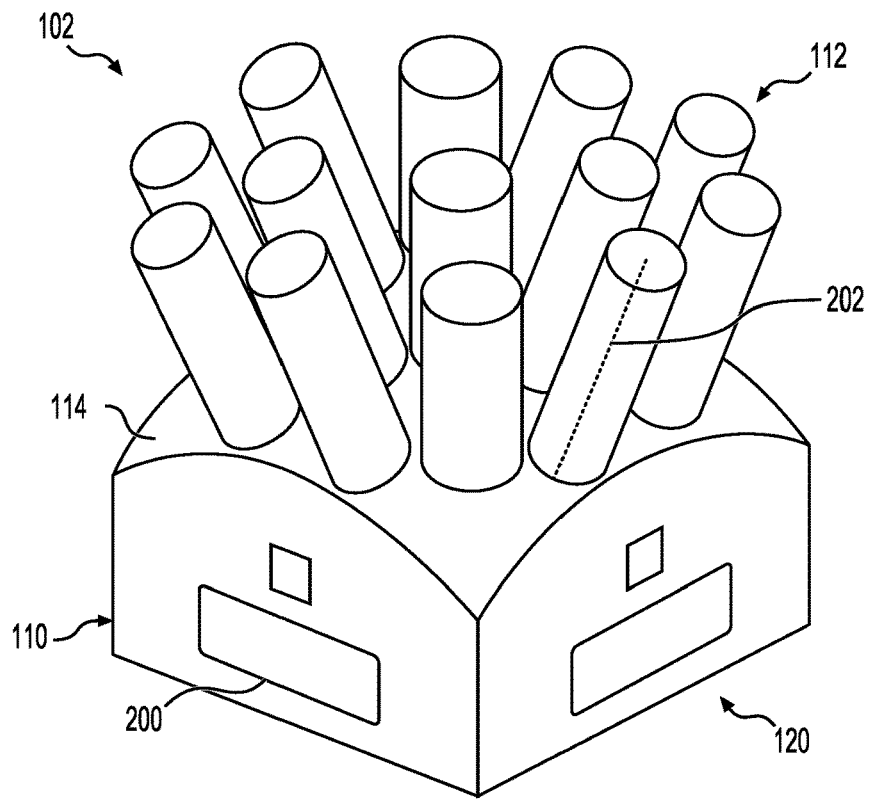
FIG. 2A illustrates a perspective view of the lasing module of FIG. 1, showing optical modules coupled atop a housing of the lasing module, according to an example of the present disclosure.
Figure 2B:
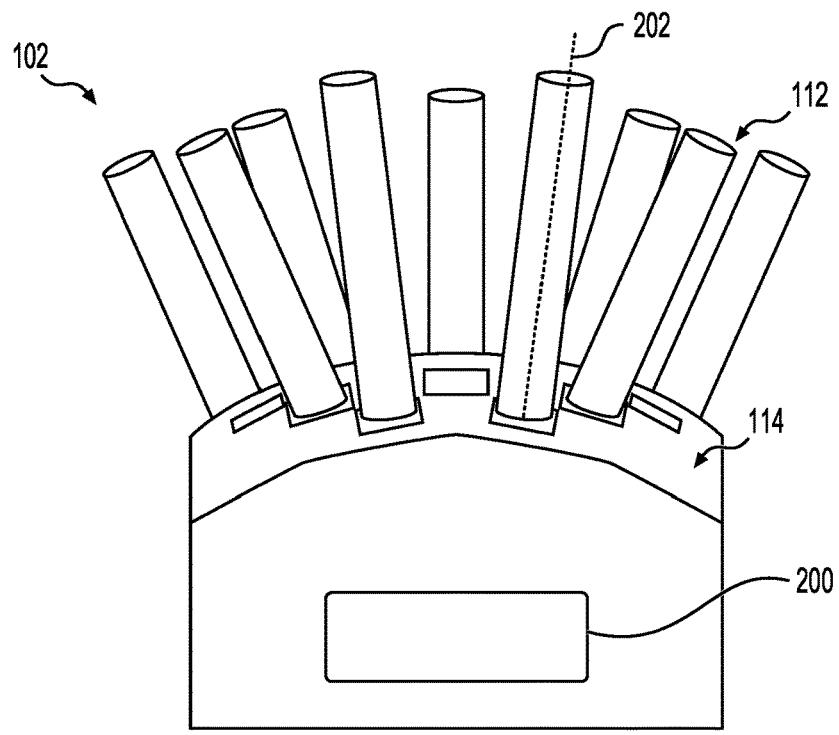
FIG. 2B illustrates a side view of the lasing module of FIG. 1, showing optical modules coupled atop a housing of the lasing module, according to an example of the present disclosure.

FIGS. 2A and 2B illustrate various views of the lasing module 102. More particularly, FIG. 2A illustrates a top perspective view of the lasing module 102, and FIG. 2B illustrates a side view of the lasing module 102.

The lasing module 102 includes the housing 110 to which the optical modules 112 couple. In some instances, the housing 110 may form the processing chamber 120 within which parts are manufactured. For example, laser beams emitted by the optical modules 112 are steered through the processing chamber 120 for melting powdered metal within the build modules 104. The processing chamber 120 acts a hood for controlling off gases generated via melting the powdered metal.

The build modules 104, as discussed above, may move in and out of the lasing module 102 as parts are manufactured across the build modules 104. Scanners may image fiducials or other markers (e.g., barcodes, QR codes, etc.) on the build modules 104 to position the build modules 104 within the processing chamber 120, or relative to the lasing module 102. Encoders on the lasing module 102 may also measure a velocity at which the build modules 104 pass underneath the lasing module 102, allowing the lasing module 102 to manufacture parts while the build modules 104 are moving.

In some instances, the housing 110 may include viewing windows 200 for viewing parts being manufactured within the processing chamber 120. Additionally or alternatively, one or more cameras may be disposed within or on the housing 110 to capture images and/or video of the build area and parts being manufactured. The images and/or video may be which may be displayed on a viewing screen for an operator and/or may be stored for subsequent processing or viewing. Although not shown in FIGS. 2A and 2B, one or more hoses (or other ductwork) may be fluidly connected to the housing 110. A supply hose, for example, may supply air or shielding gas into the processing chamber 120, while an exhaust hose may draw air or other gasses from within the processing chamber 120 (e.g., via a fan). The supply hose and the exhaust hose may prevent a buildup of off gases and/or soot generated during a manufacture of the parts (e.g., vaporized powdered metal).

As shown, the optical modules 112 are arranged in a vertical direction atop the housing 110. The orientation of the optical modules 112 permits a greater number of lasers to be packaged within a footprint atop the housing 110. For example, the optical modules 112 may include a longitudinal axis 202 that is arranged substantially orthogonal relative to the top 114 of the housing 110. The optical modules 112 may therefore be packed closely together, in a substantially upright position, with the lasers being emitted substantially parallel to the longitudinal axis 202 towards/into the processing chamber 120.

Figure 3:
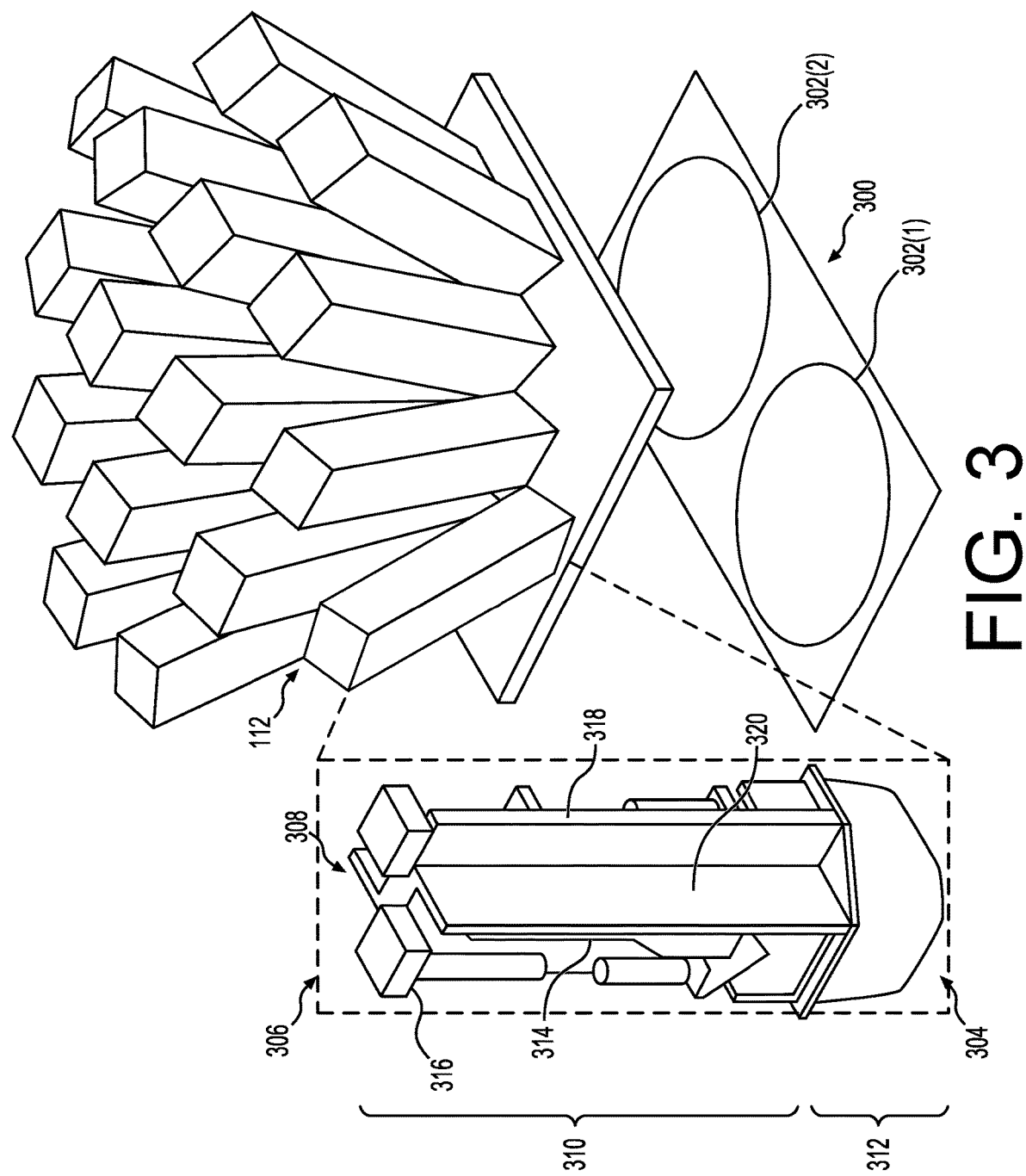
FIG. 3 illustrates an example optical module of the lasing module of FIG. 1, according to an example of the present disclosure.

FIG. 3 illustrates a perspective view of an example optical module 112, which may be representative of one of the optical modules 112 introduced above in FIG. 1. As also shown in FIG. 3, a build area 300 is disposed vertically beneath the optical modules 112 such that the optical modules 112 are mounted overhead of the build area 300. In some instances, the build area 300 may include at least a first portion 302(1) and a second portion 302(2). The first portion 302(1) may be disposed within the first build module 104(1), whereas the second portion 302(2) may be disposed within the second build module 104(2). As such, the lasing module 102 may be configured to manufacture parts within separate containers of the build modules 104 at the same time. In some instances, each of the optical modules 112 of the lasing module 102 may be capable of being steered towards a portion, or all of, the build area 300 (e.g., mirror(s)). In such instances, the field of views of the individual optical modules 112, or the lasers contained therein, may overlap. In some instances, the field of view of the laser may be substantially the same, or equal to, the build area 300. For example, the optical modules 112 may be arranged such that all of the lasers within the optical modules 112 may be steered towards any position within the build area 300.

The laser beams generated within the optical modules 112 may be steered towards the first portion 302(1) and/or the second portion 302(2), depending on the parts being manufactured, a placement of the optical modules 112 on the lasing module 102, an orientation of the optical modules 112, and/or availability of the optical modules 112 (e.g., online, busy, etc.). However, in some instances, the farther the laser beams are directed from a particular optical module 112, the greater a spot size of the laser beam. Lens(es), for example, may adjust the focal length of the laser beams for maintaining a consistent spot size.

Additionally, or alternatively, rather than steering the laser beams to respective portions in the build area 300, the laser beams may be clustered together to create larger melt pools. In general, a cluster includes two or more laser beams that at least partially overlap each other in a region of the powder bed. For example, laser beam(s) may be clustered together to increase an amount of power directed to a particular location within the build area 300. This increase in power may create larger spot sizes, or melt pools. Each of the lasers may therefore be independently, or collectively, operable to create separate or multiple parts simultaneously, with flexible energy delivery. In turn, this allows the lasers to be highly utilized and continuously operate with minimal downtime. Examples of clustering or beamforming laser beams are described in U.S. patent application Ser. No. 16/773,864 filed Jan. 27, 2020, the entirety of which is herein incorporated by reference.

Although the first portion 302(1) and the second portion 302(2) are shown being circular in shape, the first portion 302(1) and the second portion 302(2) may include different shapes (e.g., square, hexagonal, triangular, etc.). In some instances, the build area 300 may include a size of approximately 750 mm×750 mm. Moreover, although a certain number of optical modules 112 are shown coupled to the housing 110, any number of optical modules 112 may couple to the housing 110 For example, the lasing module 102, in some instances, may include thirty two lasers disposed within sixteen optical modules. In such instances, the lasing module 102 may include sixteen of the optical modules 112, where each of the optical modules 112 includes two lasers.

Turning to the specifics of the optical module 112, the optical module 112 may include a first end 304 that couples to the top 114 of the housing 110, and a second end 306 spaced apart from the first end 304. In some instances, the second end 306 may include various connectors (e.g., fiber, Ethernet, etc.) for receiving commands or instructions associated with controlling an operation of the optical module 112 (e.g., laser beam energy, laser beam width, etc.). In some instances, the optical module 112 couples to the housing 110 via fasteners, snap-fits, compression fits, male and female connectors (e.g., threads), and the like. In doing so, the optical module 112 may be easily serviced or interchangeable with other optical modules 112 in the event of malfunctions or a failure of one or more components of the optical module 112. In some instances, thermal barriers or other insulators may be interposed between the top 114 of the housing 110 and the optical module 112 for reducing heat transfer between the optical module 112 and the housing 110, vice versa.

The optical module 112 includes a frame 308 to which components of the optical module 112 couple. The frame 308 provides structural rigidity to the optical module 112 and, as discussed herein, serves to orient components of the optical module 112 towards the build area 300. For this reason, the frame 308 may include flanges, brackets, mounts, receptacles, and so forth for receiving the components, or to which the components couple. In some instances, the frame 308 is manufactured from a material with a low thermal expansion. Example materials include, but are not limited to, nickel-iron alloys, nickel-chromium alloys, nickel-cobalt alloys, and/or cobalt-chromium alloys. The low thermal expansion of the frame 308 may assist in maintaining an accuracy and precision of the laser beams emitted by lasers of the optical module 112. For example, as the laser emits laser beams, heat is generated and the frame 308 may assist is dissipating generated heat. Additionally, one or more heat sinks may couple to the frame 308. Heat sink(s) may also couple to the components of the optical module 112, such as the laser.

Still, in some instances, the frame 308 may include conduits or other ductwork disposed within a body of the frame 308. For example, a conduit may traverse (e.g., snake) within the body of the frame 308. Here, the conduit may form or represent cavities within the frame 308 and liquids and/or air may be forced through the conduit for transferring heat away from the components of the optical module 112. The conduit may include an inlet to receive the fluid and an outlet for output the fluid. External pump(s) may supply and draw fluid through the conduits. In some instances, rather than the conduit being formed within a body of the frame 308, one or more pipes may be coupled (e.g., bonded, adhered, etc.) to an exterior of the frame 308. Such heat dissipating mechanisms provide thermal stability (e.g., consistent temperature) to the optical module 112 and/or reduce thermal drift to improve precision, repeatability, and accuracy of the 3D printing system 100.

The optical module 112 may include a laser delivery and imaging subassembly 310 and a focusing and steering subassembly 312. Additional details of the laser delivery and imaging subassembly 310 and the focusing and steering subassembly 312 are described in FIGS. 6A and 6B.

Although the laser delivery and imaging subassembly 310 and the focusing and steering subassembly 312 are described as separate components, in some instances, the laser delivery and imaging subassembly 310 and the focusing and steering subassembly 312 may be embodied within a single assembly. The optical module 112, in some instances, includes multiple laser delivery and imaging subassemblies 310, and/or multiple focusing and steering subassemblies 312, such as two. Here, a first laser delivery and imaging subassembly may generate a first laser beam and image a first melt pool associated with the first laser beam, whereas a second laser delivery and imaging subassembly may generate a second laser beam and image a second melt pool associated with the second laser beam. Similarly, the optical module 112 may include a first focusing and steering subassembly for steering the first laser beam and/or focusing the first laser beam, whereas a second focusing and steering subassembly may be used for steering the second laser beam and/or focusing the second laser beam. As discussed herein, although a single laser delivery and imaging subassembly and a single focusing and steering subassembly are discussed, it is to be understood that other laser delivery and imaging subassemblies and other focusing and steering subassemblies may include similar components and function similarly. For example, the laser delivery and imaging subassembly 310 and the focusing and steering subassembly 312 may be disposed on opposite sides of the frame 306.

The laser delivery and imaging subassembly 310 generates laser beams by a laser 314 towards the build area. The laser delivery and imaging subassembly 310 also transmits images of the melt pool towards an imaging sensor 316. Both the laser 314 and the imaging sensor 316 couple to the frame 308, such as a first side of the frame 308. In some instances, the laser 314 may couple to a central member 318 of the frame 308 and/or a flange 320 that extends from the central member 318. The flange 320 may also provide stiffening to the optical module 112, or the frame 308, during thermal expansion and to maintain an alignment of the laser 314. In some instances, the laser delivery and imaging subassembly 310 may be located closer to the second end 306 of the optical module 112 than the focusing and steering subassembly 312.

The focusing and steering subassembly 312 serves to focus and steer laser beams emitted by the laser 314. For example, the focusing and steering subassembly 312 may include various mirror(s) and/or lens(es) that direct the laser beams towards the build area 300. The mirror(s) and/or lens(es) may also direct imaging beams towards the imaging sensor 316. However, the laser delivery and imaging subassembly 310 may include mirror(s) and/or lens(es) for steering the laser beam towards the build area 300 and/or the imaging beam(s) towards the imaging sensor 316. As shown, the focusing and steering subassembly 312 may be disposed at the first end 304 of the optical module 112. In some instances, the focusing and steering subassembly 312 may adjust a spot size associated with the laser beams and/or an image size of image(s) captured by the imaging sensor(s).

The imaging beam(s) represent thermal imaging data of the melt zone (e.g., where the powdered metal is melted) by the laser beams in the build area 300. Image(s) captured by the imaging sensor 316 are used to detect the melt zone for use in determining whether the manufacturing process is successful (e.g., producing parts without defects and with correct structures). For example, laser beam location, power, focus, and speed may be adjusted based on analyzing the image(s) of the melt pool.

The components of the laser delivery and imaging subassembly 310, and the focusing and steering subassembly 312 may couple to the frame 308, whether the central member 318 or the flange 320 via various hardware, mounts, and so forth. In some instances, the components may couple to the frame 308 via one or more kinematic mounts to provide six degrees of freedom (e.g., three translations and three rotations). The coupling to the frame 308 permits conduits formed within the frame 308 to transfer generated heat.

Figure 4:
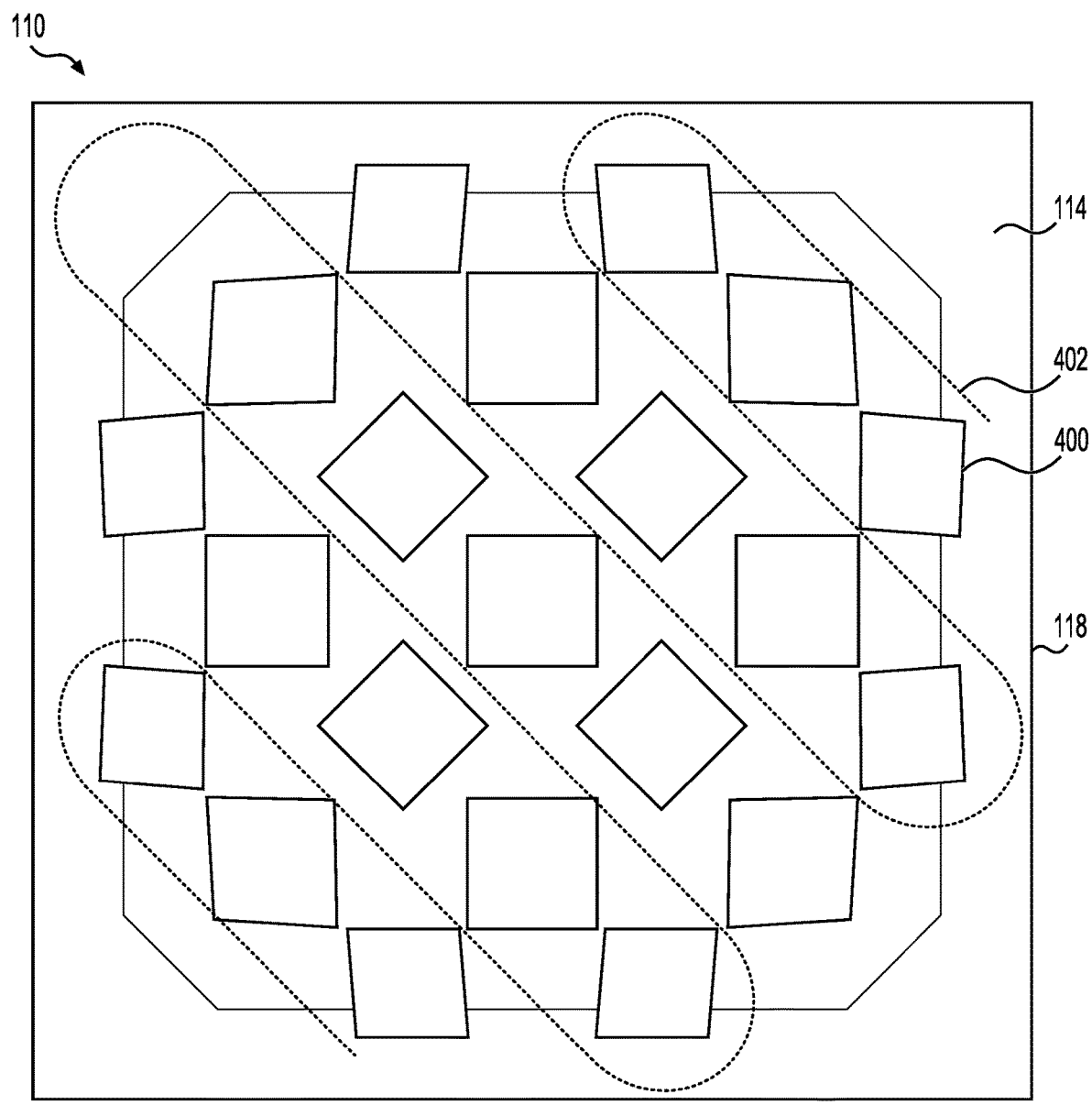
FIG. 4 illustrates a top view of an example housing of the lasing module of FIG. 1 to which the optical modules couple, according to an example of the present disclosure.

FIG. 4 illustrates a top view of the housing 110 of the lasing module 102, showing the optical modules 112 removed. As shown, the housing 110 may include a square shape, but the top 114 of the housing 110 may be dome-shaped for receiving the optical modules 112. As introduced above, the dome-shaped curvature of the top 114 enables a high packing density of the optical modules 112 to work collaboratively and collectively within the build area 300. Moreover, the positioning of the optical modules 112 about the top 114 may provide increased freedom when manufacturing parts. That is, by disposing the optical modules 112 at various positions, an angle of incidence at which laser beams penetrate the powdered metal varies (as compared to the laser beams being oriented straight down). This allows for complex parts or geometries including overhangs, thin walls, and/or features to be manufactured.

Each of the optical modules 112 may be arranged above or adjacent to a transmission window 400 that are disposed across the top 114 of the housing 110. The transmission windows 400 may reside within respective passages formed through the housing 110. The transmission windows 400 may be arranged or otherwise oriented at various angles in comparison to one another. For example, some of the transmission windows 400 may be oriented perpendicular to the sides 118 of the housing 110, whereas other transmission windows 400 may be disposed at other angles relative to the sides of the housing 110 (or other transmission windows 400). By way of example, some of the transmission windows 400 may be oriented at approximately 45 degrees. The orientation of the transmission windows 400 may increase a packing density of the optical modules 112 on the top 114. Moreover, in some instances, the orientation of the transmission windows 400 may provide the optical modules 112 with different orientations or fields of view within the build area 300, permitting flexibility in part manufacturing. Although the transmission windows 400 are shown being square in shape, other shapes are envisioned (e.g., circular). Moreover, the transmission windows 400 may be sufficient size to permit multiple laser beams generated with the optical module 112 to pass therethrough. For example, each of the optical modules 112 may include two lasers (e.g., one disposed on a first size of the frame 308 and another disposed on an opposite side of the frame 308) and the transmission window 400 may be large enough to permit the laser beams to pass therethrough.

As explained herein, laser beams emitted by the lasers may transmit through the transmission windows 400, respectively, for melting powdered metal within the build area 300. The transmission windows 400 may also permit imaging beam(s) to be transmitted to imaging sensors 316 disposed in the optical modules 112. In some instances, the housing 110 may include a corresponding number of transmission windows 400 as the optical modules 112.

In some instances, the housing 110 may include cooling plates or piping for transferring heat generated by components coupled to the top 114, such as the optical modules 112. In some instances, for example, conduits 402 may be machined within the top 114. The conduits 402 may receive coolant via pumps, chillers, for example, for transferring heat away from components coupled to the top 114, as well as heat within the processing chamber 120. Inlets may receive the fluid, and outlets may expel the fluid (e.g., for conditioning). The conduits 402 may be routed in any suitable fashion (e.g., zig-zag, snake, etc.) across the top 114, between the transmission windows 400, and so forth. However, in some instances, in addition to or alternative from the conduits 402 being within the top 114, cooling plates or piping may be adhered to an external surface of the top 114.

Figure 5:
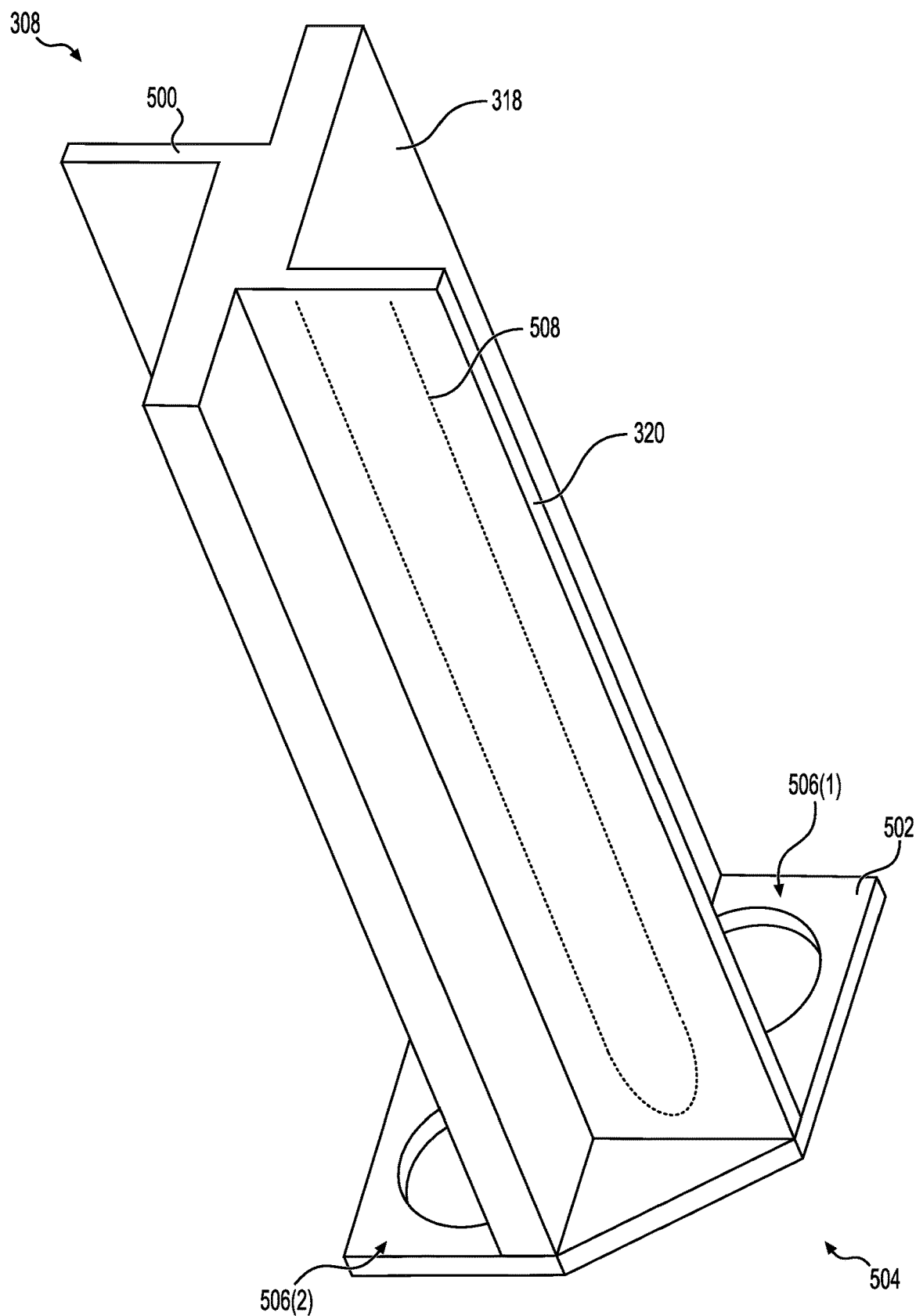
FIG. 5 illustrates an example frame of the optical module of FIG. 3, according to an example of the present disclosure.

FIG. 5 illustrates the frame 308 of the optical module 112, showing the components of the optical module 112 removed to better illustrate features of the frame 308. For example, the laser delivery and imaging subassembly 310 and the focusing and steering subassembly 312 are shown removed to better illustrate the frame 308. As introduced above, the frame 308 includes the central member 318, as well as the flange 320 that extends from the central member 318. In some instances, the central member 318 may be formed at least in part by two plates that are adhered (e.g., welded) together. The frame 308 may further include an additional flange 500 disposed on an adjacent side of the frame 308 (or the central member 318), as the flange 320. The additional flange 500 may receive an additional laser delivery and imaging subassembly, and an additional focusing and steering subassembly for other lasers and/or imaging sensors.

The frame 308 includes a bracket 502 disposed at an end 504. The bracket 502 is shown defining passageways through which laser beams are transmitted to reach the build area 300. For example, the bracket 502 may define a first passage 506(1) through which a first laser beam is transmitted (e.g., via the first laser 314), and a second passage 506(2) through which a second laser beam is transmitted (e.g., via a second laser 314). In some instances, the focusing and steering subassembly 312 (or multiple focusing and steering subassemblies) may couple to the bracket 502, at the end 504. Components of the focusing and steering subassembly 312, such as one or more objective lens(es) and/or one or more expander lens(es) (e.g., focus lens) may at least partially reside within the first passage 506(1) and the second passage 506(2), respectively. As such, the focusing and steering subassembly 312, or components thereof (e.g., mirror(s)) may receive the laser beam for steering the laser beam towards the build area 300. It is to be understood that the focusing and steering subassembly 312 may include respective mirror(s), lens(es), and/or other components for independently steering multiple laser beams emitted by lasers to respective positions in the build area.

In some instances, the bracket 502 may include cooling plates or piping for transferring heat generated by components coupled to the bracket 502, such as the focusing and steering subassembly 312. In some instances, for example, conduits 508 may be machined within/internal to the frame 308. The conduits 508 may receive coolant via pumps, chillers, for example, for transferring heat away from components coupled to the frame 308. In some instances, the conduits 508 may be within the central member 318, flange 320, the additional flange 500, and/or the bracket 502. Inlets may receive the fluid, and outlets may expel the fluid (e.g., for conditioning). The conduits 508 may be routed in any suitable fashion (e.g., zig-zag, snake, etc.). However, in some instances, in addition to or alternative from the conduits 508 being machined into the frame 308 cooling plates or piping may be adhered to an external surface of the frame 308.

Generally, the frame 308 may represent an elongated member and includes features to which the components couple. In some instances, the frame 308 may further including alignment mechanisms (e.g., pins, slots, tabs, etc.) that are machined into the frame 308 to reduce the number of external brackets coupled to the frame 308. For example, kinematic mounts may couple to the frame 308 and orient the various components of the laser delivery and imaging subassembly 310, and the focusing and steering subassembly 312.

Figure 6A:
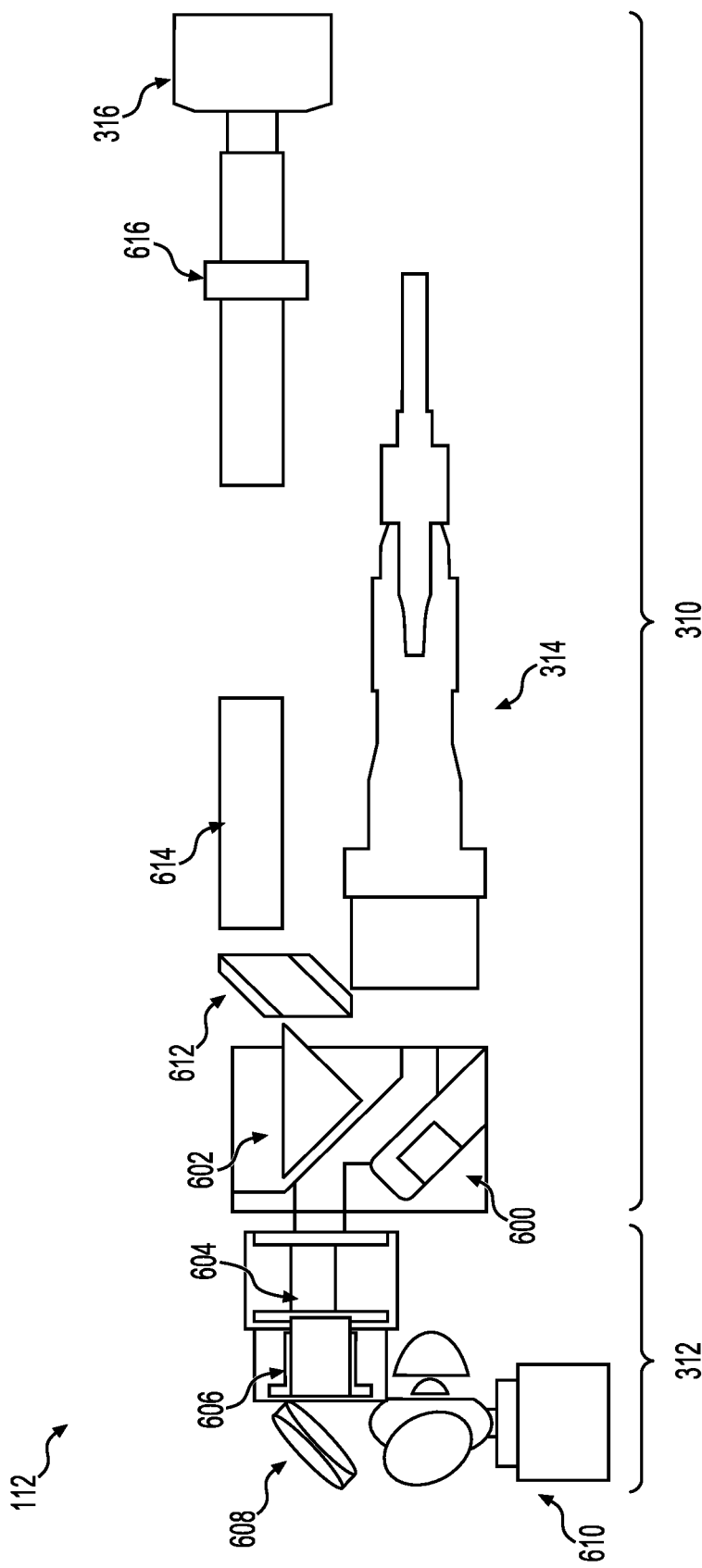
FIG. 6A illustrates example components of the optical module of FIG. 3 with the example frame omitted for clarity, according to an example of the present disclosure.
Figure 6B:
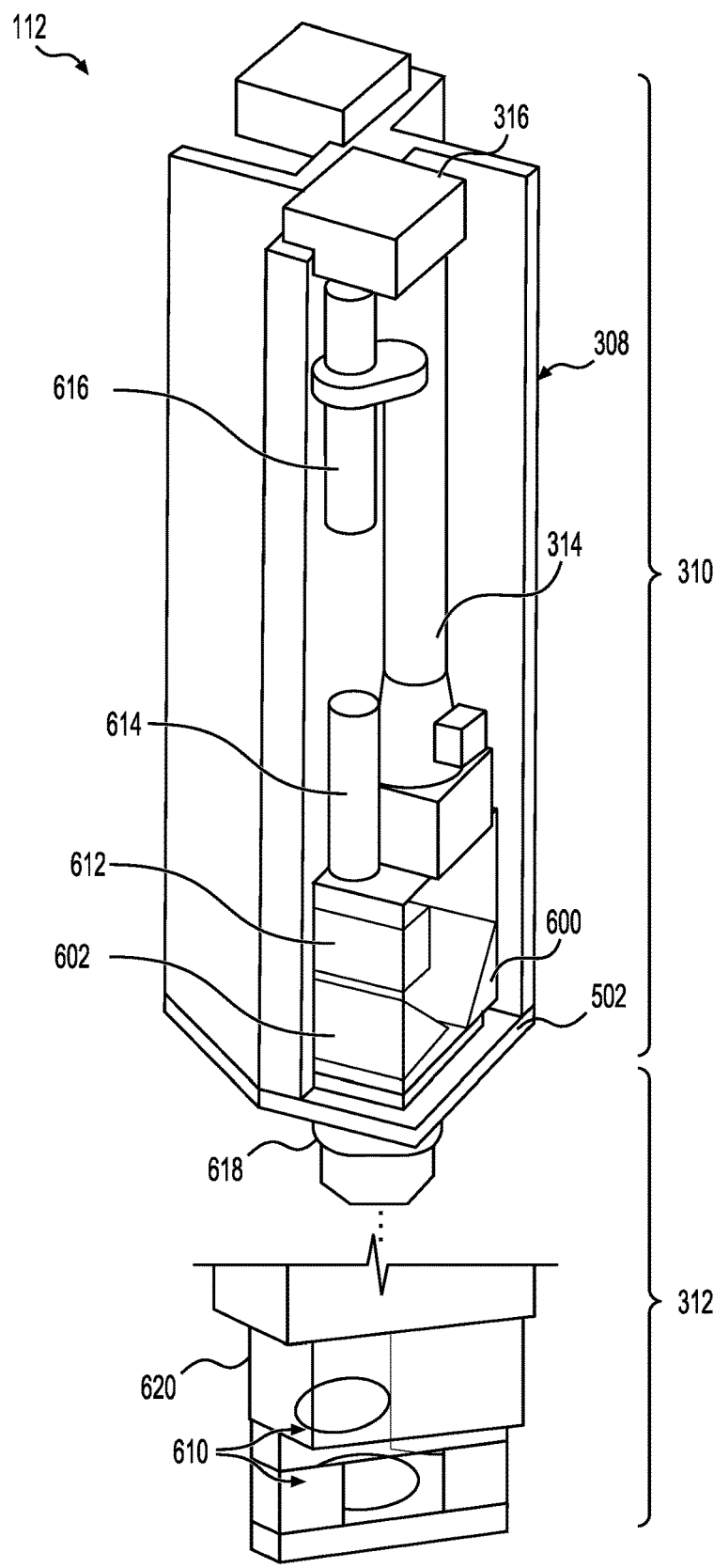
FIG. 6B illustrates a perspective view of the components of the optical module of FIG. 3 coupled to the frame of FIG. 5, according to an example of the present disclosure.

FIGS. 6A and 6B illustrate example components of the optical module 112. In some instances, the components shown in FIG. 6A may couple to the frame 308, as discussed hereinabove, and as further shown in FIG. 6B. However, the frame 308 is omitted in FIG. 6A to better illustrate components of the optical module 112.

The optical module 112, in some instances, includes the laser 314 (as introduced above), a laser mirror 600, a dichroic mirror 602, one or more expander lens(es) 604, one or more objective lens(es) 606, a turning mirror 608, and galvo mirrors 610. The laser 314 may represent a collimated laser that generates a laser beam having a low beam divergence. As introduced above, the laser beam generated by the laser 314 is directed towards the build area 300 via the various mirror(s) and/or lens(es) of the optical module 112. In some instances, the laser 314 may have a diameter of approximately 9.3 mm and may output a wavelength of approximately 1075 microns. The laser 314 may also be operable up to or above 750 Watts (W). For example, the laser 314 may be operable between 500 W and 750 W. In some instances, the use of 750 W lasers, as compared to higher powered lasers conventionally used to melt powdered metal, may reduce a cost and complexity of the 3D printing system 100, provide more granular and precise control of the power imparted to a melt pool and/or the area of which the power is imparted to the melt pool using multiple laser beams, as well as reduce an amount of heat generated during use.

As a laser beam is emitted by the laser 314, the laser mirror 600 steers the laser beam to the dichroic mirror 602. The laser mirror 600 may represent a turning mirror that turns the direction of an incoming laser beam 90 degrees. The dichroic mirror 602 reflects the laser beam towards the one or more expander lens(es) 604 and the one or more objective lens(es) 606. As will be explained herein, the dichroic mirror 602 reflects the laser beam while being transmissive to other light of different wavelengths. For example, the dichroic mirror 602 may be reflective to wavelengths above 1000 microns, but may be transmissive to wavelengths below 1000 microns.

In some instances, the one or more expander lens(es) 604 and/or the one or more objective lens(es) 606 may be collectively referred to as a focus control lens that focuses a spot size associated with the laser beam. A focus controller may change a working distance, field, and spot size of the laser beams by translating the one or more expander lens(es) 604 and/or the one or more objective lens(es) 606 along a length of the laser beam (e.g., longitudinally). For example, a linear motor may shift the one or more expander lens(es) 604 and/or the one or more objective lens(es) 606. In doing so, the one or more expander lens(es) 604 and/or the one or more objective lens(es) 606 have an adjustable position along the path of the laser beam to change the resulting focal length. An example focus controller may include Newson's Focus Controller ELA-TR4.

The one or more expander lens(es) 604 may first receive the laser beam from the dichroic mirror 602. The one or more expander lens(es) 604 serve to increase a diameter of the laser beam. Therein, the laser beam is transmitted to the one or more objective lens(es) 606, which may include multiple expander lens(es), such as two. The one or more objective lens(es) 606 serve to focus the laser beam, as noted above. The one or more objective lens(es) 606 may include simple curvatures that add spherical aberration to the laser beam to focus a center of the laser beam. In FIG. 6A, the one or more objective lens(es) 606 may be placed in series adjacent to one another, however, any order of combination of one or more expander lens(es) 604 and the one or more objective lens(es) 606 may be used.

After passing through the one or more expander lens(es) 604 and the one or more objective lens(es) 606 (or the focus control lens), the turning mirror 608 directs the laser beam towards the galvo mirrors 610. In some instances, the positioning of the turning mirror 608 directs the laser beam perpendicularly towards the galvo mirrors 610. In doing so, the optical module 112 may have a smaller footprint as compared to conventional approaches. For example, conventional approaches may orient lasers horizontally relative to the build area 300. In such instances, less lasers are able to be packaged together into a similar footprint. However, noted herein, the vertical arrangement of the optical modules 112 permits a greater density of optical modules 112 to be packaged onto the top 114 of the housing 110. Given this orientation of the laser 314, however, the turning mirror 608 is included to reflect the imaging beams towards the galvo mirrors 610.

The galvo mirrors 610 generally represents a single axis steering mirror. The galvo mirrors 610 may include a first galvo mirror and a second galvo mirror, where each of the galvo mirrors 610 is independently operable to steer the laser beams (e.g., via one or more motors) about a single axis. Therefore, in combination, the galvo mirrors 610 may have two axis steering. The galvo mirrors 610 may each couple to a motor that moves the galvo mirror to steer the laser beam in different directions by rotating and adjusting mirror angles. In some instances, a first galvo mirror steers the laser beam about a first axis, as received from the turning mirror 608, onto the second galvo mirror, which steers the laser beam about a second axis onto selected portions of the build area 300 within the processing chamber 120. Prior to entering the processing chamber 120, the laser beam may pass through the transmission window 400. In some instances, the first galvo mirror and the second galvo mirror may be oriented substantially orthogonally to one another.

The optical module 112 may further include components for imaging the melt pool produced by the laser beam. For example, the optical module 112 may include the imaging sensor 316 (as introduced above), which may represent a high speed camera, that images the melt pool. One specific example imaging sensor 316 may include Mikrotron's EoSens 1.1CXP2 CoaXPress Camera. Images from the imaging sensor 316 are used to determine a size (e.g., area) and/or shape (e.g., aspect ratio) of the melt pool, or other characteristic(s) of the melt pool, such as a thermal signatures, gradients, or profiles.

In some instances, some or all of the components discussed above that steer the laser beam onto the build area 300 may further be used to enable the imaging sensor 316 to image the melt pool. For example, the dichroic mirror 602 may reflect the laser beam, while transmitting certain wavelengths of light onto the imaging sensor 316. Therefore, in some instances, the laser beam and imaging beams transmitted to the imaging sensor 316 may be substantially parallel over at least portions of their paths within the optical module 112. Additionally, to steer and focus light towards the imaging sensor 316, the optical module 112 may include a periscope mirror 612, a doublet focus lens 614, and/or a liquid dynamic lens 616. Such components permit the imaging sensor 316 to image the melt pool. Additionally, such components focus the light (e.g., in focus) towards the imaging sensor 316. In some instances, a fold mirror pair may be included, between the doublet focus lens 614 and the liquid dynamic lens 616 to direct imaging beams to the imaging sensor 316.

The periscope mirror 612 represents a pair of mirrors that are parallel to each other at a 45 degree angle. The imaging beams, after being transmitted through the dichroic mirror 602, may reflect off a first mirror of the periscope mirror 612 and a second mirror may receive the reflected light from the first mirror. After reflecting off/through the periscope mirror 612, the imaging beams may pass through the doublet focus lens 614 (e.g., achromatic doublet), which represents a pair of simple lenses. The doublet focus lens 614 may bring light of different wavelengths (e.g., Red, Blue, Green) into focus with one another. That is, the doublet focus lens 614 collimates two or more different wavelengths of light to a common focus (e.g., polychromatic light). The doublet focus lens 614 may also correct aberrations introduced by the one or more expander lens(es) 604 and/or the one or more objective lens(es) 606 for focusing light associated with the melt pool.

In instances in which a fold mirror pair is included, a first mirror of the fold mirror pair may receive the light from the doublet focus lens 614, and direct the light to a second mirror of the fold mirror pair. The second mirror of the fold mirror pair then directs the light to the liquid dynamic lens 616. In some instances, the first mirror of the fold mirror pair may be disposed adjacent to the liquid dynamic lens 616, whereas the second mirror of the fold mirror pair may be disposed adjacent to the doublet focus lens 614. Here, after the imaging beam(s) pass through the doublet focus lens 614, the imaging beam(s) may first reflect off the first mirror of the fold mirror pair towards the second mirror of the fold mirror pair. The second mirror of the fold mirror pair then directs the imaging beam(s) into the liquid dynamic lens 616. In some instances, the use of the fold mirror pair may aid in the compact nature of the optical module 112. In instances in which the fold mirror pair are used, the liquid dynamic lens 616 and/or the imaging sensor 316 may be relocated (e.g., closer to the laser 314).

In some instances, the fold mirror pair may permit kinematic adjustments to be made to account for deviation in manufacturing. For example, during manufacturing of the optical module 112, it is envisioned that slight inconsistencies in part size and alignment may exist. The use of the fold mirror pair may serve to lessen manufacturing tolerances and by adjusting one or more mirrors of the fold mirror pair, the lighting beam(s) may be directed (e.g., centered) on the imaging sensor 316. However, as shown and in some instances, the fold mirror pair may be eliminated and the position of the liquid dynamic lens 616 and/or the imaging sensor 316 may be altered to image the melt pool. That is, the imaging beam may pass directly through the doublet focus lens 614 and into the liquid dynamic lens 616. The doublet focus lens 614 and the liquid dynamic lens 616 may be concentric.

The liquid dynamic lens 616 includes an optical-grade liquid that changes in shape, causing the liquid dynamic lens 616 to change optical power, and therefore in focal length and working distance. The liquid dynamic lens 616 may be electrically or mechanically controlled such when a current or voltage is applied, a shape of the polymer membrane containing the liquid changes. This alters optical properties of the liquid dynamic lens 616 for autofocusing the incident imaging beam(s). The dynamic adjustment maintains clarity for quality of colors imaged by the imaging sensor 316 and adjusts an image size imaged by the imaging sensor 316. The liquid dynamic lens 616 is also fast acting with minimal downtime when the polymer membrane refocuses. An example liquid dynamic lens 616 may include Optotune's EL-16-40-TC-VIS-5D-C, which as a focal length ranging from −2 diopter (dpt) (−500 mm) to 3 dpt (333 mm). The liquid dynamic lens 616 may permit large adjustments in focus, may include fast settle times, and may require less power as compared to conventional focus lenses such as motor or voice-coil driven lenses or Tunable Acoustic Index Gradient (TAG) lenses.

As the one or more expander lens(es) 604 and/or the one or more objective lens(es) 606 (or the focus controller) adjust a spot size of the laser beam, an image size of the melt pool imaged by the imaging sensor 316 may correspondingly change. As an example, by steering the laser beam to different positions on the build area 300, a length of the laser beam is adjusted. To maintain a consistent spot size, however, the one or more expander lens(es) 604 and/or the one or more objective lens(es) 606 may adjust. In doing so, and because the laser beam and the imaging beam(s) include a similar optical path, the image size may be varied. To account for such, the imaging sensor 316 is configured to image imaging beam(s) of different color (e.g., wavelength) for imaging the melt pool.

In some instances, static focusing optics may be used alternatively to the liquid dynamic lens 616. Here, the static focusing optics, or any other optics that result in the desired image size on the imaging sensor 316, may be used.

After passing through the liquid dynamic lens 616, the imaging beam(s) may be received by the imaging sensor 316. In turn, the imaging sensor 316 may image the melt pool (e.g., spot size associated with the laser beam(s)). Depending on this feedback, a controller of the optical module 112 (discussed herein), for example, may communicate with various components of the optical module 112 (e.g., galvo mirrors 610) for changing the spot size and/or image size. However, the controller may control a steering of the galvo mirrors 610 using a feed forward algorithm. The feed forward algorithm may reduce latency when steering the laser beam via the galvo mirrors 610. That is, the galvo mirrors 610 themselves may have a degree of latency before steering, but the controller may proactively steer the galvo mirrors 610 to increase a response time.

In some instances, the laser mirror 600, the dichroic mirror 602, the one or more expander lens(es) 604, the one or more objective lens(es) 606, the turning mirror 608, the doublet focus lens 614, the fold mirror pair, and/or the liquid dynamic lens 616 may be mounted to kinematic mounts that are capable of translating to adjust a spot size of the laser beam and/or an image size of images captured by the imaging sensor 316.

As shown, the components of the optical module 112 may be packaged to create a small footprint. The size of the footprint assists in arranging the optical modules 112 about the geodesic dome of the housing 110 and permitting a plurality of the optical modules 112 to reside on the top 114. Because of this, the optical module 112 or other portions of the 3D printing system 100 include heat dissipating elements for removing generated heat and providing thermal stability.

The discussion above is describes optical components for a single laser and a single imaging sensor. For example, the mirror(s) and lens(es) described above may steer and focus first laser beams and first imaging beams. However, the optical module 112 may include similar components to steer and focus second laser beams emitted by a second laser and second imaging beams imaged by a second imaging sensor. In such instances, the optical module may include multiple lasers and imaging sensors, and may include respective mirrors and lenses to permit their operation.

FIG. 6B illustrates a perspective view of the optical module 112. The components of the laser delivery and imaging subassembly 310 are shown coupled to the frame 308, above the bracket 502, while the focusing and steering subassembly 312 may couple to the frame 308, below the bracket 502. Additionally, FIG. 6B illustrates the galvo mirrors 610 being spaced apart from the bracket 502.

As shown, the laser 314 is arranged to output a laser beam towards the laser mirror 600, whereby the laser beam is reflected towards the dichroic mirror 602. The laser beam is then transmitted through the one or more expander lens(es) 604 and/or the one or more objective lens(es) 606 (or the focus controller), which are shown residing within a casing 618 in FIG. 6B. The galvo mirrors 610 then direct the laser beam into the build area 300. In some instances, the galvo mirrors 610 are disposed within a cover 620. The cover 620 may be disposed over the galvo mirrors 610 and/or the one or more objective lens(es) and the one or more expander lens(es) 604 (or the casing 618) when coupled to the frame 308.

Furthermore, to steer imaging beams towards the imaging sensor 316, the imaging beam(s) are reflected off the galvo mirrors 610, off the turning mirror 608, through the one or more objective lens(es) 606, and through the one or more expander lens(es) 604. Therein, the imaging beam(s) are transmitted through the dichroic mirror 602, through the periscope mirror 612, through the doublet focus lens 614, and are then transmitted through the liquid dynamic lens 616. In instances in which the fold mirror pair is included, the imaging beam(s) may pass through the doublet focus lens 614, reflect off the fold mirror pair, and the transmitted through the liquid dynamic lens 616.

In some instances, the laser 314, the imaging sensor 316, the laser mirror 600, the dichroic mirror 602, the fold mirror pair (when included), the periscope mirror 612, the doublet focus lens 614, and the liquid dynamic lens 616 make up or represent components of the laser delivery and imaging subassembly 310. In some instances, the laser delivery and imaging subassembly 310 couples to the frame 308 at a location above the bracket 502 (e.g., between the bracket 502 and the an end of the frame 308 opposite the end 504. In some instances, the galvo mirrors 610, the turning mirror 608, the one or more objective lens(es) 606, and/or the one or more expander lens(es) 604 make up or represent components of the focusing and steering subassembly 312. In some instances, the focusing and steering subassembly 312 couples to the frame 308 at a location below the bracket 502 (e.g., between the bracket 502 and the end 504. However, although the components are described with regard to the laser delivery and imaging subassembly 310 or the focusing and steering subassembly 312, the components may be interchangeable and/or associated with each of the subassemblies. For example, the galvo mirrors 610 enable imaging of the imaging beam(s) by the imaging sensor 316.

Figure 7A:
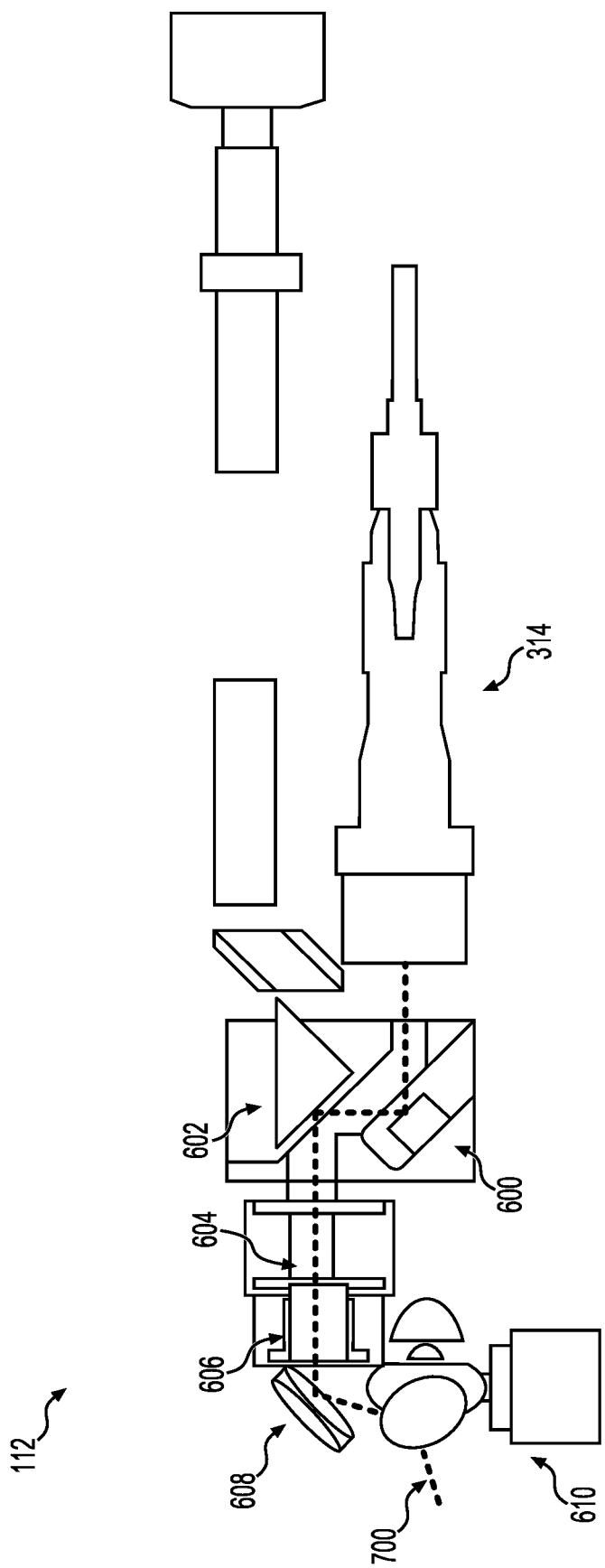
FIG. 7A illustrates an example path of an example laser beam emitted by a laser of the optical module of FIG. 3, according to an example of the present disclosure.

FIG. 7A illustrates an optical path of a laser beam 700 within the optical module 112. In some instances, the laser beam 700 may be generated by the laser 314, as introduced above. However, it is to be understood that the lasers within other optical modules 112 may generate similar laser beams with a simmer optical path.

The optical module 112 includes various mirror(s) and/or lens(es) for delivering the laser beam 700 into/onto the build area 300. Such mirror(s) and lens(es) may be components of the laser delivery and imaging subassembly 310, and the focusing and steering subassembly 312. As shown, the laser beam 700 is emitted by the laser 314 in a direction towards the laser mirror 600. The laser beam 700 may be emitted orthogonally to a reflective surface of the laser mirror 600. The laser beam 700 is then reflected towards the dichroic mirror 602. The dichroic mirror 602 reflects the laser beam 700 and the laser beam 700 then passes through the one or more expander lens(es) 604 and the one or more objective lens(es) 606 (e.g., the focus lens/controller). The one or more objective lens(es) 606 introduce spherical aberration into the laser beam 700 for focusing the laser beam 700 and generating desired spot sizes on the build area 300. The one or more expander lens(es) 604 and/or the one or more objective lens(es) 606 have an adjustable position along an optical axis of the laser beam 700 to control the spot size of the laser beam 700. In some instances, the focusing of the laser beam 700 may result in spot sizes that are less than 130 microns. In some instances, the spot sizes may be between approximately 80-100 microns or smaller. The steering of the laser beam 700 within the optical module 112, through the various mirror(s) and lens(es), changes a length of the path associated with the laser beam 700 and creates corresponding spot sizes. By dynamically moving the mirror(s) and/or lens(es), the spot size is adjusted and an amount of power directed at the build area 300 adjusts.

The turning mirror 608 therein directs the laser beam 700 towards the galvo mirrors 610. As shown, the turning mirror 608 may turn the direction of the incoming laser beam 700 90 degrees. In some instances, the laser beam 700 that is reflected off the turning mirror 608 towards the galvo mirrors 610 may be substantially orthogonal to the laser beam 700 as emitted by the laser 314. In other instances, the laser beam 700 that is reflected off the turning mirror 608 towards the galvo mirrors 610 may be substantially orthogonal to the longitudinal axis 202 of the optical module 112 (between the first end 304 and the second end 306). The galvo mirrors 610 are independently steerable to direct the laser beam 700 towards various locations on the build area 300.

The steering of the laser beam 700 within the optical module 112 may maximize throughput (e.g., minimal dissipation of the laser beam 700). For example, the various mirrors along the path of the laser beam 700 may have high optical transmissions. In some instances, approximately 99% of the laser power generated by the laser 314 may be transmitted onto the powder bed within the build area 300. The lens(es) and mirror(s) within the optical module 112 may also be coated to reduce losses. However, minimal power loss may be acceptable given that the laser 314 may not operate at full capacity. The coating(s) on the lens(es) and mirror(s) may also minimize absorption, thermal lensing, and thermal losses In some instances, the mirror(s) may be coated with highly reflective (HR) coatings, whereas the lens(es) may be coated with Broadband Anti-Reflection (BBAR) coatings to improve transmission efficiency.

Although FIG. 7A illustrates a particular arrangement, or components, for steering the laser beam 700, other embodiments are envisioned. For example, the laser 314 may be oriented differently than shown (e.g., perpendicular to the dichroic mirror 602). Additionally, the order or combination in which the laser beam 700 reflect(s) and transmit(s) through the mirror(s) and the lens(es), respectively, may be different than described.

Figure 7B:
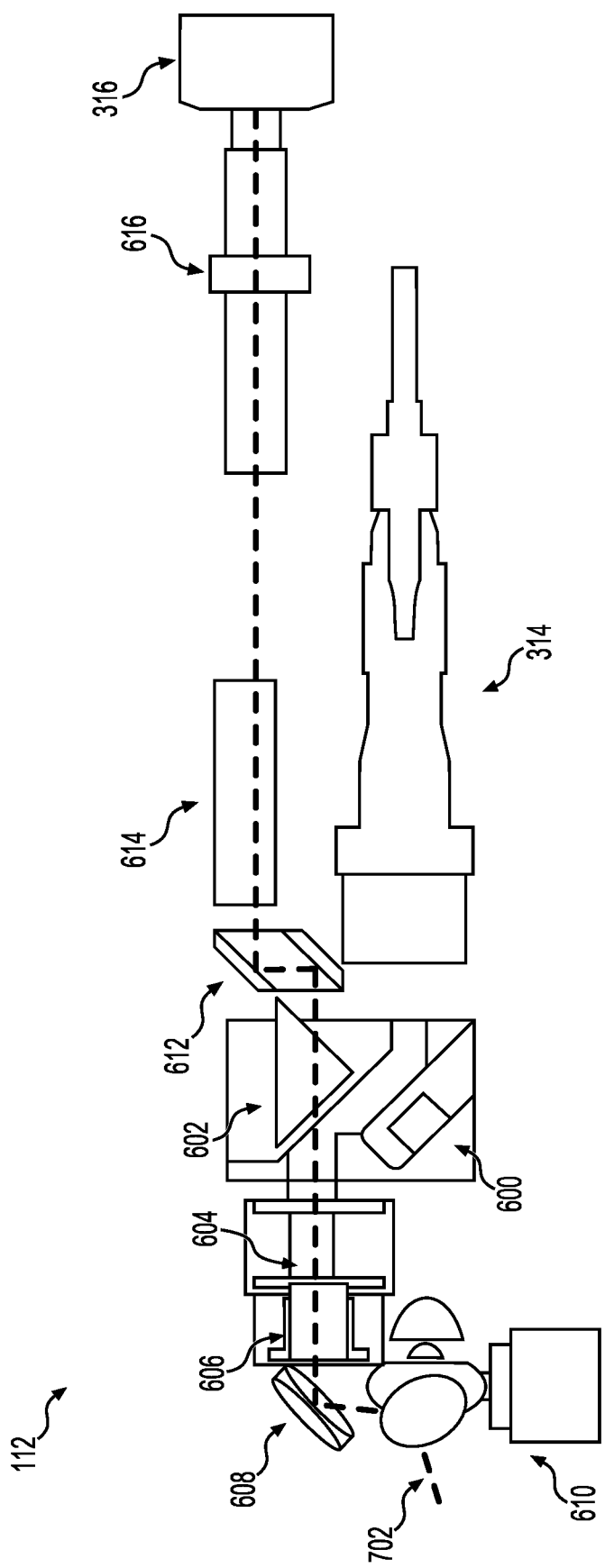
FIG. 7B illustrates an example path of an example imaging beam(s) received by an imaging sensor of the optical module of FIG. 3, according to an example of the present disclosure.

FIG. 7B illustrates an optical path of imaging beam(s) 702 within the optical module 112. In some instances, the imaging beam(s) 702 may represent multiple imaging beam (s) that converge (e.g., collimate) together at the imaging sensor 316.

As discussed above, the imaging sensor 316 is provided to image the build area 300, or more particularly, the melt pool created by the laser beam 700. An imaging beam(s) 702 may reflect off the galvo mirrors 610 and be steered towards the turning mirror 608. The imaging beam(s) 702 pass through the one or more objective lens(es) 606 and the one or more expander lens(es) 604. Upon arriving at the dichroic mirror 602, the imaging beam(s) 702 pass through the dichroic mirror 602. In some instances, at this point, the imaging beam(s) 702 may travel the same optical path as the laser beam 700, but in reverse. The imaging beam(s) 702 transmit through the dichroic mirror 602, reflect off the periscope mirror 612, through the doublet focus lens 614, through the liquid dynamic lens 616, and then arrive at the imaging sensor 316. When the fold mirror pair is included, the imaging beam(s) 702 transmit through the dichroic mirror 602, reflect off the periscope mirror 612, through the doublet focus lens 614, through the liquid dynamic lens 616, and then arrive at the imaging sensor 316. In instances in which the fold mirror pair is included, the imaging beam(s) 702 transmit through the dichroic mirror 602, reflect off the periscope mirror 612, through the doublet focus lens 614, off the fold mirror pair, through the liquid dynamic lens 616, and then arrive at the imaging sensor 316.

Image analysis of the images captured by the imaging sensor 316 are used to detect a location of the laser beam 700, temperature profiles associated with the melt pool, and/or temperature variation associated with the melt pool to improve the accuracy with which the galvo mirrors 610 steer the laser beam 700 and/or a spot size of the laser beam 700. For example, the melt pool may be detected at certain pixels in the imaging sensor 316, with each pixel corresponding to a particular location on the powder bed. Given a known relationship between pixels and locations on the powder bed, the galvo mirrors 610 may adjust to steer the laser beam 700 and/or a focal length of the laser beam 700 may be adjusted.

In some instances, the imaging sensor 316 may image an alignment laser emitted by the laser 314 (or an alignment laser within the optical module 112). For example, prior to generating the laser beam 700, an alignment beam may be generated and include a similar optical path as the laser beam 700. The imaging sensor 316 detects a location of the alignment laser on the powder bed to improve the accuracy with which the optical module 112 steers the laser beam 700.

Figure 8:
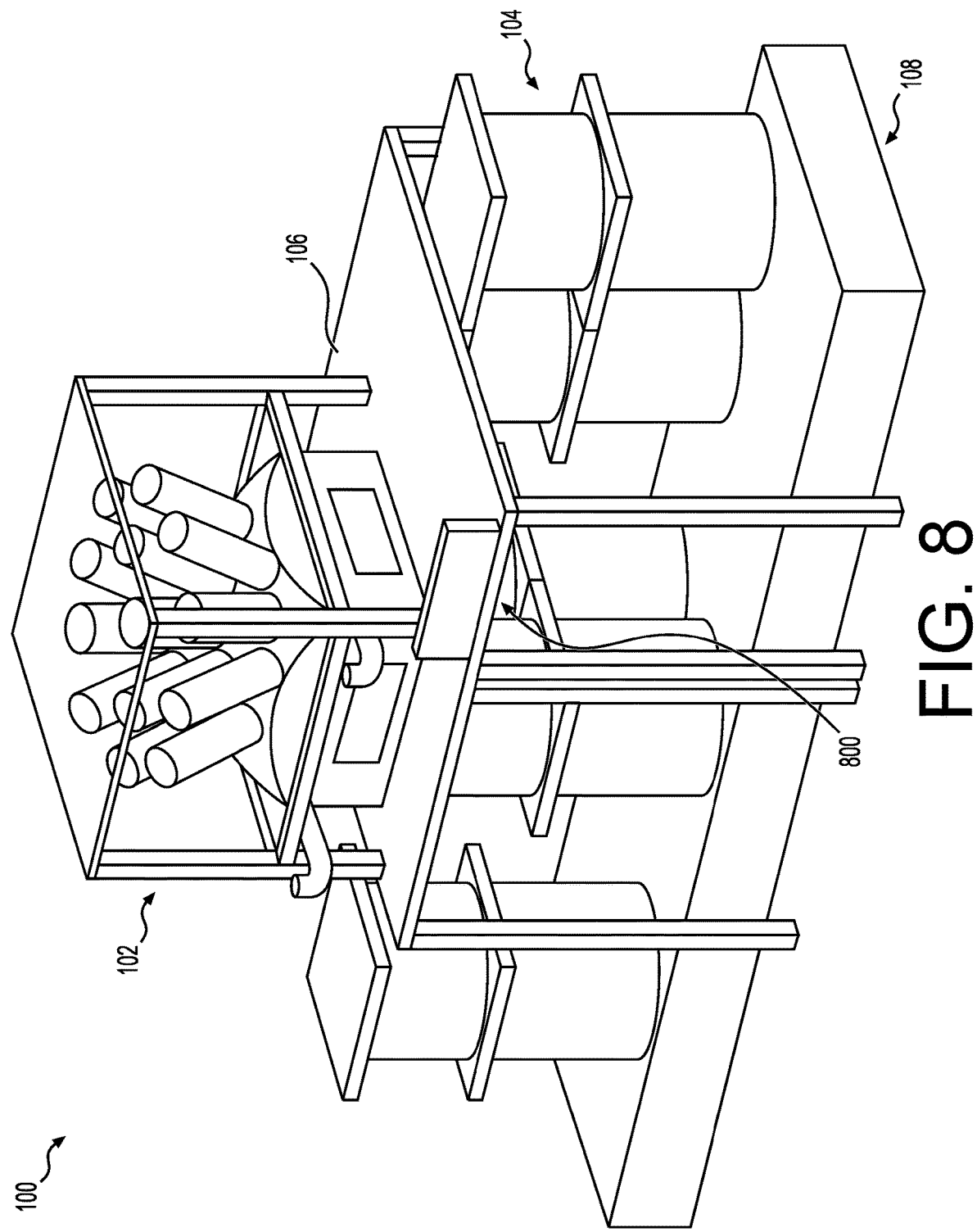
FIG. 8 illustrates an example system including the 3D printing system of FIG. 1, according to an example of the present disclosure.

FIG. 8 illustrates an example scenario whereby the 3D printing system 100 manufactures parts across a plurality of build modules 104. In FIG. 8, the lasing module 102 is shown coupled to the gantry 106 for disposing the lasing module 102 vertically above the build modules 104. The build modules 104 are shown being positioned on the conveyor system 108 (which is shown with basic components) that translates the build modules 104 into and out of the processing chamber 120. In some instances, the build modules 104 may be arranged within lines, and the conveyor system 108 may feed the build modules 104 within the lines into the processing chamber 120. However, an environment may include additional conveyors than shown for translating the build modules 104 in multiple directions, to different lasing modules disposed about the environment, and so forth. For example, a system of conveyors may be used to route the build modules 104 between different locations in the environment.

As discussed above, the lasing module 102 may manufacture parts across the build modules 104, within the build area 300. For example, in FIG. 8, two of the build modules 104 are shown below the lasing module 102. The build modules 104 are shown being circular in shape, however, other shapes are envisioned (e.g., square, hexagonal, etc.). The lasers 314 within the lasing module 102 may manufacture a first part (or a portion of the first part) within one of the build modules 104, and may manufacture a second part (or a portion of the second part) within another of the build modules 104. However, during manufacture, the parts may be cooled or coats of powdered metal may be reapplied within the build area 300 using a recoater 800.

In some instances, recoater 800 may be located on adjacent sides of the lasing module 102 for applying layers of powdered metal. While this process is occurring, other build modules 104 may be conveyed into the processing chamber. Here, additional parts are manufactured. In such instances, a downtime of the lasers 314 are minimized and the lasers 314 are utilized for consistently manufacturing parts. The recoater 800 is shown being decoupled from the lasing module 102, or a separate component as the lasing module 102. In doing so, while recoating is occurring, the lasing module 102 may be manufacturing In some instances, each of the build modules 104 may include fiducials (e.g., barcode, QR code, etc.) that are imaged by sensors (e.g., cameras) of the lasing module 102. As the build modules 104 enter the processing chamber 120, the sensor(s) may image the fiducials for obtaining information associated with the part being manufactured within the particular build module 104. This allows the lasers 314 to be instructed (e.g., steered) for manufacturing the part. For example, after the fiducials are imaged, such image(s) may be used to determine a progress of the part, a step in manufacturing the part, a location of the part within the build module 104, and so forth. Such information is used to control the lasers 314 for manufacturing the part.

Additionally, it is to be understood that during manufacture, any number of lasers may be used across the build modules 104. That is, because the lasers 314 are capable of being steering to any position within the build area 300, the lasers 314 may be steered to manufacture parts within a single build module 104, across build modules 104, or both. Moreover, mirrors allow the lasers 314 to be selectively, and individually, steered towards particular locations on the build area 300.

Figure 9:
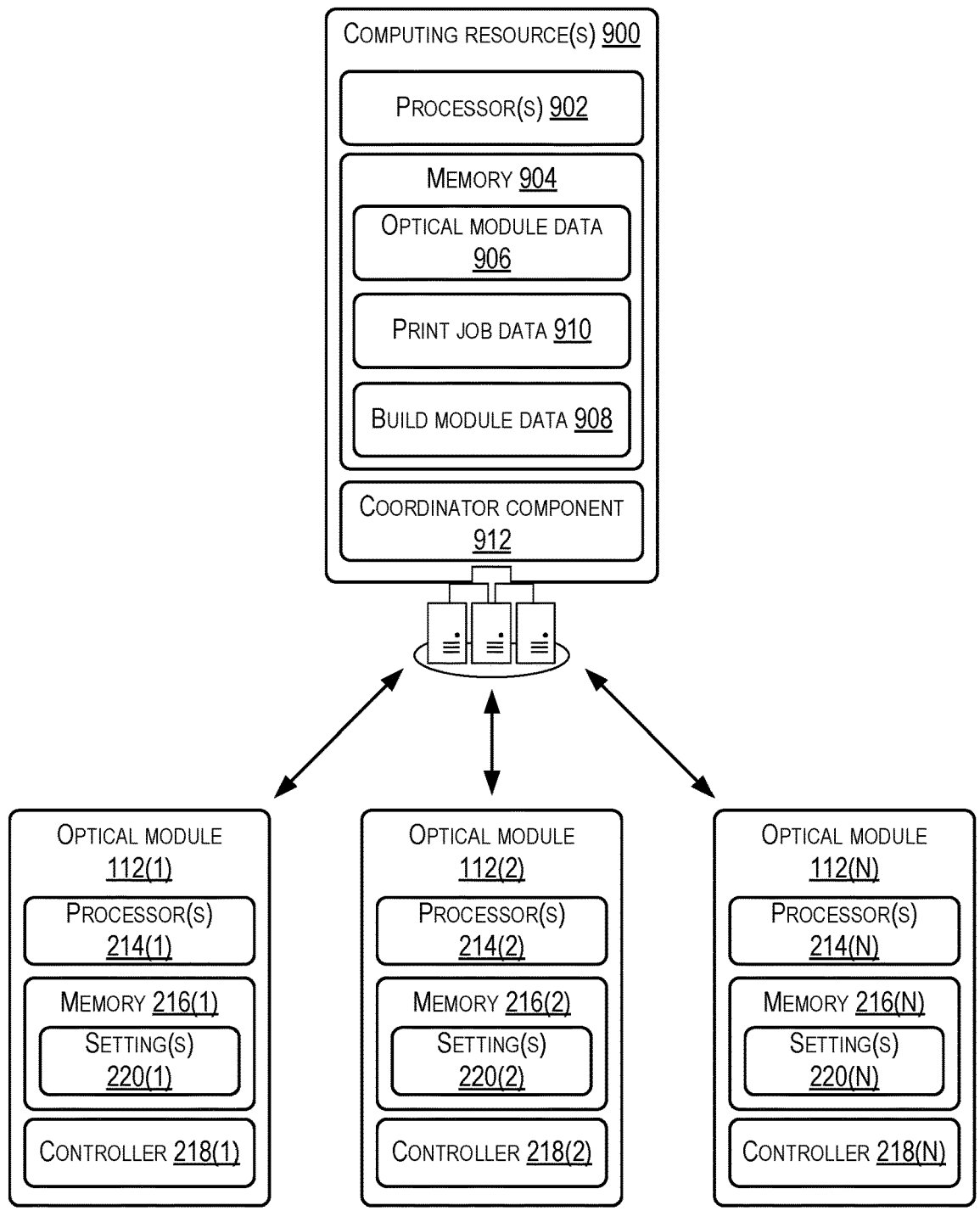
FIG. 9 illustrates example computing components for manufacturing parts using the 3D printing system of FIG. 1 and the example system of FIG. 8, according to an example of the present disclosure.

FIG. 9 illustrates example components for controlling an operation of a 3D printing system, such as the 3D printing system 100. Computing resource(s) 900 are shown being in communication with optical modules 112(1)-(N), such as a first optical module 112(1), a second optical module 112(2), and up to nth optical modules 112(N) for at least partially controlling an operation of the optical modules 112(1)-(N) (or component(s) of the optical modules 112(1)-(N)). In some instances, the optical modules 112(1)-(N) may be similar to and/or represent the optical modules 112 as discussed above. For example, each of the optical modules 112(1)-(N) may include multiple lasers 314, imaging sensors 316, mirror(s), lens(es), and so forth.

In some instances, the computing resource(s) 900 may be a component of the 3D printing system 100, or may be a component remote from the 3D printing system 100. The computing resource(s) 900 are shown including processor(s)

902 and memory 904, where the processor(s) 902 may perform various functions and operations associated with controlling the optical modules 112 and the memory 904 may store instructions executable by the processor(s) 902 to perform the operations described herein. The computing resource(s) 900 may in communication with the optical modules 112 via wired (e.g., ethernet, USB, fiber optic, serial, etc.) or wireless (e.g., radio frequency, Bluetooth, Wi-Fi, cellular, etc.) technologies.

The memory 904 is shown storing or having access to optical module data 906, build module data 908, and/or print job data 910. The optical module data 906 may include identifiers or information associated with the optical modules 112(1)-(N). Such information may be used when communicating with the individual optical modules 112(1)-(N). In some instances, the optical modules 112(1)-(N) may represent optical modules of a single 3D printing system, or may represent optical modules across one or more 3D printing systems. In some instances, the optical module data 906 further includes characteristics of the optical modules 112(1)-(N), such as laser beam power, usage (e.g., availability), location, spot size, steering location, lens(es) and/or mirror(s) orientation, and so forth. Such information may be used for knowing a state of the optical modules 112(1)-(N). The memory 904 may further store image data captured by imaging sensor(s) of the optical modules 112(1)-(N).

The build module data 908 may include information associated with the build modules 104, such as a location of the build modules 104 within an environment, a part being manufactured within the build module 104, a type of powdered material in the build module 104, a size of the build module 104 (or a container thereof), and so forth. The location of the build module 104 may be tracked throughout an environment as the build modules 104 traverse the conveyor systems 108.

The print job data 910 may correspond to parts that are to be built within the build modules 104. For example, the print job data 910 may indicate sides, surfaces, features, and so forth that make up or form the part. The print job data 910 may be used in conjunction with the optical module data 906 for manufacturing the parts. For example, the optical modules 112(1)-(N) may be instructed to manufacture parts queued in the print job data 910.

In some instances, the computing resource(s) 900 include a coordinator component 912 for controlling or instructing the optical modules 112(1)-(N). For example, depending on a part to be manufactured, or a particular portion of the part, the coordinator component 912 may transmit instructions to the optical modules 112(1)-(N), respectively for steering mirror(s) towards a particular location on the build area 300. Additionally, or alternatively, the coordinator component 912 may also control an amount of power emitted by laser(s) of the optical modules 112(1)-(N) and/or a focal point of lens(es) of the optical modules 112(1)-(N). Such control may change a spot size associated with the laser beams emitted by the optical modules 112(1)-(N).

In such instances, changing the spot size correspondingly changes a size of an image imaged by the imaging sensor. That is, because the laser beam and the imaging beam(s) may at least partially share an optical path, adjusting the spot size or a beam length of the laser beam correspondingly changes the image size. For example, at a distant point on the build area, the path length of the laser beam may be longer as compared to when the path of the laser beam direct towards a closer point. To maintain a consistent spot size, the lens(es) may be adjusted. However, being as the imaging sensor is able to receive/image light of various wavelengths, the imaging sensor may still be capable of imaging the melt pool.

The coordinator component 912 may utilize the optical module data 906, the build module data 908, and/or the print job data 910 for use in directing certain optical modules 112(1)-(N) when manufacturing parts. The coordinator component 912 may also be in communication with the optical modules 112(1)-(N) for knowing whether and when the optical modules 112(1)-(N) (or components thereof) are malfunctioning or otherwise non-operational. Such status may be used when scheduling optical modules 112(1)-(N) for repair or replacement, or for redirecting other optical modules 112(1)-(N) to manufacture parts assigned to the non-operational optical modules 112(1)-(N). For example, in the event that the 3D printing system 100 includes 32 lasers, and one of the lasers malfunctions, the coordinator component 912 may instruct another optical module 112(1)-(N) to output laser beams within a certain location in the build area previously melting powdered material.

In some instances, the optical modules 112(1)-(N) themselves may include controller(s), switches, and the like that are responsive to instructions transmitted by the coordinator component 912. For example, each of the optical modules 112(1)-(N) may include processor(s) and memory. The first optical module 112(1) is shown including first processor(s) 214(1) and first memory 216(1), the second optical module 112(2) is shown including second processor(s) 214(2) and second memory 216(2), and the nth optical module 112(N) is shown including nth processor(s) 214(N) and nth memory 216(N). The processor(s) 214(1)-(N) may perform various functions and operations associated with controlling the laser(s), imaging sensor(s), mirror(s), lens(es), etc. of the optical modules 112(1)-(N), respectively, and the memory 216(1)-(N) may store instructions executable by the processor(s) 214(1)-(N) to perform the operations described herein. For example, the processor(s) 214(1)-(N) may receive instructions from the computing resource(s) 900 associated with manufacturing parts, and the processor(s) 214 may control components of the optical modules 112(1)-(N), respectively, to carry out those instructions.

In some instances, the optical modules 112(1)-(N) may include controllers that cause the optical modules 112(1)-(N) to control the laser(s), imaging sensor(s), mirror(s), lens(es), etc. of the optical modules 112(1)-(N). For example, the first optical module 112(1) may include a first controller 218(1), the second optical module 112(2) may include a second controller 218(2), and the nth optical module 112(N) may include an nth controller 218(N). Each of the controllers 218(1)-(N) is responsive to instructions from the computing resource(s) 900, or may be independently operable to cause the optical modules 112(1)-(N) to perform certain operations. In some instances, for example, the controllers 218(1)-(N) may actuate galvo mirrors based on a receiving instructions as to a melting location within the build area 300.

The memory 216(1)-(N) may also respectively store setting(s) 220(1)-(N) that correspond to parameters of the optical modules 112(1)-(N). For example, the setting(s) 220(1)-(N) may include beam powers, steering directions, beam path length, and so forth. The controllers 218(1)-(N) may respectively utilize the setting(s) 220(1)-(N) for controlling an operation of the optical modules 112(1)-(N).

In some instances, the computing resource(s) 900 may be implemented as one or more servers and may, in some instances, form a portion of a network-accessible computing platform implemented as a computing infrastructure of processors, storage, software, data access, etc. that is maintained and accessible via a network such as the Internet. The computing resource(s) 900 does not require end-user knowledge of the physical location and configuration of the system that delivers the services. Common expressions associated for the computing resource(s) 900 include "on-demand computing", "software as a service (SaaS)", "platform computing", "network-accessible platform", "cloud services", "data centers", etc. However, the computing resource(s) 900 may be located within a same environment as the 3D printing system 100.

As used herein, a processor, such as the processor(s) 902 and/or 914(1)-(N) may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 904 and/or 916(1)-(N) may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
a build module having a powder bed containing powdered metal; and
a lasing module including:
a housing at least partially defining a chamber disposed over the powder bed, the housing having a dome shaped top and a bottom opposite the dome shaped top, the bottom being disposed above the powder bed, and
a plurality of optical modules coupled to the dome shaped top, wherein individual optical modules of the plurality of optical modules comprise:
a laser configured to emit a laser beam, the laser oriented substantially orthogonal to the dome shaped top,
a first mirror configured to steer the laser beam onto the powder bed,
a first lens configured to adjust a spot size of the laser beam on the powder bed,
an imaging sensor configured to capture a light beam reflected from a melt pool created by the laser beam within the powder bed,
a second mirror configured to steer the light beam to the imaging sensor, and
a second lens configured to focus the light beam for capture by the imaging sensor.

2. The system of claim 1, wherein:
the laser comprises a first laser;
the imaging sensor comprises a first imaging sensor; and
the individual optical module includes:
a frame having a first side and a second side,
the first laser and the first imaging sensor are disposed on the first side of the frame, and
a second laser and a second imaging sensor are disposed on the second side of the frame.

3. The system of claim 1, wherein:
the first mirror comprises:
a turning mirror,
a dichroic mirror, or
a galvo mirror; and
the second mirror comprises:
a periscopic mirror, or
a fold mirror pair.

4. The system of claim 1, wherein:
the first lens comprises:
an objective lens, or
an expander lens; and
the second lens comprises:
a doublet focus lens, or
a liquid dynamic lens.

5. The system of claim 1, wherein:
the laser beam includes a laser beam path within the individual optical module; and
the light beam includes a light beam path within the individual optical module, the light beam path at least partially paralleling the laser beam path within the individual optical module.

6. The system of claim 1, wherein at least one individual optical module of the plurality of optical modules further comprises:

a second laser configured to emit a second laser beam;
a second mirror configured to steer the second laser beam onto the powder bed;
a second lens configured to adjust a spot size of the second laser beam on the powder bed;
a second imaging sensor configured to capture a second light beam reflected from a second melt pool created by the second laser beam within the powder bed;
a third mirror configured to steer the second light beam to the second imaging sensor; and
a third lens configured to focus the second light beam for capture by the second imaging sensor.

7. A three dimensional (3D) printing system comprising:
a powder bed including powdered metal; and
a lasing module disposed vertically above the powder bed, the lasing module including:
 a housing defining a processing chamber above the powder bed, and
 a plurality of optical modules situated vertically above the processing chamber,
 wherein individual optical modules of the plurality of optical modules comprise one or more lasers arranged to output laser beams towards the powder bed, the one or more lasers having a longitudinal axis arranged substantially vertical relative to the powder bed.

8. The 3D printing system of claim 7, wherein the housing includes a top to which the plurality of optical modules couple, the top having a plurality of apertures, and laser beams generated by the plurality of optical modules are introduced to the processing chamber through the plurality of apertures.

9. The 3D printing system of claim 7, further comprising a plurality of imaging sensors, wherein an individual imaging sensor of the plurality of imaging sensors is arranged to image a melt pool of the powdered metal generated by the laser beams.

10. The 3D printing system of claim 7, wherein the individual optical module includes one or more mirrors and one or more lens for steering the laser beams toward the powder bed.

11. The 3D printing system of claim 7, wherein the individual optical module includes:
 a frame to which the one or more lasers couple; and
 a heat dissipating element disposed in, on, or coupled to the frame.

12. The 3D printing system of claim 7, further comprising a plurality of optical modules, wherein individual optical modules of the plurality of optical modules include:
 an imaging sensor configured to capture a light beam reflected from a melt pool created by the laser beams on the powder bed, and wherein:
 the laser beams have a first wavelength;
 the light beam has a second wavelength; and
 a dichroic mirror reflective to the first wavelength and transmissive to the second wavelength.

13. A lasing module comprising:
a housing configured to be disposed over a powder bed, the housing having a top; and
a plurality of optical modules disposed on the top, wherein individual optical modules of the plurality of optical modules include:
 a laser configured to emit a laser beam along a first path,
 a first mirror configured to steer the laser beam onto the powder bed,
 a first lens configured to adjust a spot size of the laser beam on the powder bed,
 an imaging sensor configured to capture a light beam reflected from a melt pool created by the laser beam on the powder bed, the light beam having a second path that at least partially overlaps with the first path at a location within the individual optical modules,
 a second mirror configured to steer the light beam to the imaging sensor, and
 a second lens configured to focus the light beam for capture by the imaging sensor.

14. The lasing module of claim 13, wherein:
the top comprises a domed shape;
the individual optical modules have a longitudinal axis; and
the individual optical modules are coupled to the dome shaped top with the longitudinal axis being substantially orthogonal to a surface of the dome shaped top.

15. The lasing module of claim 13, wherein individual optical modules further includes:
 a second laser configured to emit a second laser beam;
 a third mirror configured to steer the second laser beam onto the powder bed;
 a third lens configured to adjust a second spot size of the second laser beam on the powder bed;
 a second imaging sensor configured to capture a second light beam reflected from a second melt pool created by the second laser beam on the powder bed;
 a fourth mirror configured to steer the second light beam to the second imaging sensor; and
 a fourth lens configured to focus the second light beam for capture by the second imaging sensor.

16. The lasing module of claim 13, wherein the plurality of optical modules comprises at least eight optical modules.

17. The lasing module of claim 13, wherein:
the first mirror comprises:
 a turning mirror,
 a dichroic mirror, or
 a galvo mirror; and
the second mirror comprises:
 a periscopic mirror, or
 a fold mirror pair.

18. The lasing module of claim 17, wherein:
the first lens comprises:
 an objective lens, or
 an expander lens; and
the second lens comprises:
 a doublet focus lens, or
 a liquid dynamic lens.

19. The lasing module of claim 13, wherein the powder bed is disposed across one or more build modules that translate into and out of the housing.

20. The lasing module of claim 13, further comprising a first galvo mirror and a second galvo mirror, wherein:
the first galvo mirror and the second galvo mirror are configured to steer the laser beam onto the powder bed; and
the first galvo mirror and the second galvo mirror are configured to steer the light beam to the imaging sensor.

* * * * *